(12) United States Patent
Sreenivasan et al.

(10) Patent No.: US 10,990,261 B2
(45) Date of Patent: Apr. 27, 2021

(54) HVAC GRAPHICAL USER INTERFACE WITH VISUAL OBSCURITY AND METHODS OF USE THEREOF

(71) Applicant: Trane International Inc., Davidson, NC (US)

(72) Inventors: Sriram Sreenivasan, Chennai (IN); James Brink, Andover, MN (US); Rick Kloeppner, Dayton, MN (US); Sean Fuller Mosley, Minneapolis, MN (US); Susan M. Mairs, St. Paul, MN (US); Harikrishnan M G, Chennai (IN); Sagar Sampat Salunkhe, Ghoti Khurd (IN)

(73) Assignee: Trane International Inc., Davidson, NC (US)

( * ) Notice: Subject to any disclaimer, the term of this patent is extended or adjusted under 35 U.S.C. 154(b) by 50 days.

(21) Appl. No.: 16/176,619

(22) Filed: Oct. 31, 2018

(65) Prior Publication Data

US 2020/0133471 A1 Apr. 30, 2020

(51) Int. Cl.
| | | |
|---|---|---|
| *G06F 3/0484* | (2013.01) | |
| *F24F 11/52* | (2018.01) | |
| *G06F 3/0488* | (2013.01) | |
| *G06F 3/0482* | (2013.01) | |
| *G05B 19/042* | (2006.01) | |

(52) U.S. Cl.
CPC .......... *G06F 3/04847* (2013.01); *F24F 11/52* (2018.01); *G05B 19/042* (2013.01); *G06F 3/0482* (2013.01); *G06F 3/04886* (2013.01); *G05B 2219/2614* (2013.01); *G06F 2203/04804* (2013.01)

(58) Field of Classification Search
None
See application file for complete search history.

(56) References Cited

U.S. PATENT DOCUMENTS

| | | |
|---|---|---|
| 6,851,621 B1 | 2/2005 | Wacker et al. |
| 7,055,759 B2 | 6/2006 | Wacker et al. |
| 7,083,109 B2 | 8/2006 | Pouchak |
| 7,222,800 B2 | 5/2007 | Wruck |
| 7,341,201 B2 | 3/2008 | Stanimirovic |
| 7,565,813 B2 | 7/2009 | Pouchak |
| 7,848,765 B2 | 12/2010 | Phillips et al. |
| 8,024,054 B2 | 9/2011 | Mairs et al. |
| 8,099,178 B2 | 1/2012 | Mairs et al. |
| 8,200,700 B2 | 6/2012 | Moore et al. |
| 8,335,593 B2 | 12/2012 | Johnson et al. |
| 8,346,397 B2 | 1/2013 | Harrod et al. |
| 8,347,088 B2 | 1/2013 | Moore et al. |
| 8,452,457 B2 | 5/2013 | Matsuoka et al. |

(Continued)

*Primary Examiner* — Christopher J Fibbi
(74) *Attorney, Agent, or Firm* — Womble Bond Dickinson (US) LLP

(57) ABSTRACT

An HVAC controller operable in an occupied mode and an unoccupied mode and includes a touch-responsive display. The controller displays an informational region having non-interactive user interface elements, a control region having interactive user-interface elements and an override region having an occupied status display and an occupancy override control having an override state and a non-override state. The visual properties of the variable opacity region is manipulated to guide the user during use of the HVAC controller.

16 Claims, 21 Drawing Sheets

(56) References Cited

U.S. PATENT DOCUMENTS

| | | |
|---|---|---|
| 8,473,852 B2 | 6/2013 | Russell |
| 8,544,285 B2 | 10/2013 | Stefanski et al. |
| 8,554,376 B1 | 10/2013 | Matsuoka et al. |
| 8,556,188 B2 | 10/2013 | Steinberg |
| 8,572,516 B1 * | 10/2013 | Mitchell ............... G06F 21/629 |
| | | 715/867 |
| 8,600,564 B2 | 12/2013 | Imes et al. |
| 8,606,374 B2 | 12/2013 | Fadell et al. |
| 8,645,495 B2 | 2/2014 | Johnson et al. |
| 8,757,507 B2 | 6/2014 | Fadell et al. |
| 8,761,946 B2 | 6/2014 | Matsuoka et al. |
| 8,840,033 B2 | 9/2014 | Steinberg |
| 8,893,032 B2 | 11/2014 | Bruck et al. |
| 9,002,523 B2 | 4/2015 | Erickson et al. |
| 9,291,359 B2 | 3/2016 | Fadell et al. |
| 9,429,334 B2 | 8/2016 | Castillo et al. |
| 9,553,451 B2 | 1/2017 | Zacharchuk et al. |
| 9,596,708 B2 | 3/2017 | Logue et al. |
| 2006/0265489 A1 | 11/2006 | Moore |
| 2007/0055757 A1 | 3/2007 | Mairs et al. |
| 2007/0061046 A1 | 3/2007 | Mairs et al. |
| 2007/0061266 A1 | 3/2007 | Moore et al. |
| 2007/0061487 A1 | 3/2007 | Moore et al. |
| 2007/0067062 A1 | 3/2007 | Mairs et al. |
| 2007/0138307 A1 | 6/2007 | Khoo |
| 2008/0209342 A1 | 8/2008 | Taylor et al. |
| 2008/0222565 A1 | 9/2008 | Taylor et al. |
| 2011/0047418 A1 | 2/2011 | Drees et al. |
| 2011/0078746 A1 * | 3/2011 | Chung .................. H04N 5/445 |
| | | 725/61 |
| 2011/0178977 A1 | 7/2011 | Drees |
| 2012/0031984 A1 | 2/2012 | Feldmeier et al. |
| 2012/0130546 A1 | 5/2012 | Matas et al. |
| 2012/0130679 A1 | 5/2012 | Fadell et al. |
| 2012/0131504 A1 * | 5/2012 | Fadell ................. F24D 19/1084 |
| | | 715/810 |
| 2012/0136666 A1 | 5/2012 | Corpier et al. |
| 2012/0203379 A1 | 8/2012 | Sloo et al. |
| 2012/0221956 A1 * | 8/2012 | Geadelmann ........ G05B 15/02 |
| | | 715/736 |
| 2012/0310418 A1 | 12/2012 | Harrod et al. |
| 2013/0024799 A1 | 1/2013 | Fadell et al. |
| 2013/0087628 A1 | 4/2013 | Nelson et al. |
| 2013/0087629 A1 | 4/2013 | Stefanski et al. |
| 2013/0087630 A1 | 4/2013 | Castillo et al. |
| 2013/0090767 A1 | 4/2013 | Bruck et al. |
| 2013/0104251 A1 | 4/2013 | Moore et al. |
| 2013/0158715 A1 | 6/2013 | Barton et al. |
| 2013/0158723 A1 | 6/2013 | Erickson et al. |
| 2013/0167035 A1 | 6/2013 | Imes et al. |
| 2013/0201316 A1 | 8/2013 | Binder et al. |
| 2013/0204440 A1 | 8/2013 | Fadell et al. |
| 2013/0211783 A1 | 8/2013 | Fisher et al. |
| 2013/0227126 A1 | 8/2013 | Imes et al. |
| 2013/0255297 A1 | 10/2013 | Matsuoka et al. |
| 2013/0263034 A1 | 10/2013 | Bruck et al. |
| 2013/0338837 A1 | 12/2013 | Hublou et al. |
| 2013/0345882 A1 * | 12/2013 | Dushane ............. G05B 15/02 |
| | | 700/276 |
| 2013/0345883 A1 | 12/2013 | Sloo et al. |
| 2014/0031993 A1 | 1/2014 | Matsuoka |
| 2014/0058572 A1 | 2/2014 | Stein et al. |
| 2014/0091153 A1 | 4/2014 | Stefanski et al. |
| 2014/0143695 A1 | 5/2014 | Sundermeyer et al. |
| 2014/0277765 A1 | 9/2014 | Karimi et al. |
| 2014/0277805 A1 | 9/2014 | Browne, Jr. et al. |
| 2014/0316581 A1 | 10/2014 | Fadell et al. |
| 2014/0346239 A1 | 11/2014 | Fadell et al. |
| 2014/0358293 A1 | 12/2014 | Fadell et al. |
| 2015/0096876 A1 | 4/2015 | Mittleman et al. |
| 2015/0127167 A1 | 5/2015 | Quam et al. |
| 2015/0127170 A1 | 5/2015 | Quam et al. |
| 2015/0127171 A1 | 5/2015 | Quam et al. |
| 2015/0127172 A1 | 5/2015 | Quam et al. |
| 2015/0168001 A1 | 6/2015 | Steinberg |
| 2015/0350031 A1 | 12/2015 | Burks et al. |
| 2016/0327294 A1 * | 11/2016 | Svendsen ................ F24F 11/30 |
| 2017/0076263 A1 * | 3/2017 | Bentz .................. G05B 19/042 |

* cited by examiner

HVAC GRAPHICAL USER INTERFACE WITH VISUAL OBSCURITY AND METHODS OF USE THEREOF

BACKGROUND

1. Technical Field

The present disclosure is directed to a heating, ventilation, and air conditioning (HVAC) thermostat, and in particular, to an HVAC thermostat that provides a flexible user interface that enables a user to manage scheduling options through the use of visual opacity overlays.

2. Background of Related Art

HVAC systems are often controlled by a thermostat or controller that is mounted on a wall and enables occupants to set the desired temperature in the building. In summer months, the thermostat can be placed in a cooling mode to operate air conditioning equipment, while in the winter months the thermostat can be placed in a heating mode to operate heating equipment, for example an oil- or gas-fired furnace, an electric heater, or a heat pump.

Thermostats range in complexity from basic electromechanical round dial models that employ bimetallic strips and mercury switches, to computerized devices which employ a range of sensor and touch screen technologies to provide convenience features such as heating/cooling profiles which control temperature based on a schedule, building occupancy, and other criteria. Computerized thermostats and controllers may include remote control capability enabling a user to manage the thermostat remotely from a smart phone, tablet, or computer using a mobile application or web portal.

Such advanced thermostats may have drawbacks. As more and more features are added, the user may become overwhelmed by the available options and configuration settings. For example, it may be inconvenient for a user to manage the temperature setpoint of multiple occupancy periods that occur over the course of a day or a week because the number of discrete user inputs required to adjust a single occupancy period must be repeated for every other occupancy period to be adjusted. In cases where a user needs to manage multiple thermostats with multiple periods, the task quickly becomes tedious, time-consuming, and error-prone.

A thermostat which addresses the above shortcomings would be a welcome advance.

SUMMARY

In one aspect, the present disclosure is directed to a method of facilitating user interaction with an HVAC control device having a touch-responsive display and operable in an occupied mode and an unoccupied mode. In an exemplary embodiment the method includes displaying an informational region comprising non-interactive user interface elements, displaying a control region comprising interactive user-interface elements, displaying an override region comprising an occupied status display and an occupancy override control having an override state and a non-override state, and displaying a variable opacity region comprising the informational region and the control region.

In some embodiments, when the HVAC control device is operating in an occupied mode the variable opacity region is displayed with a first predefined opacity and when the HVAC control device is operating in an unoccupied mode the variable opacity region is displayed with a second predefined opacity. In some embodiments, the control region includes a temperature setpoint increase control and a temperature setpoint decrease control. In some embodiments, the control region is inactive when the HVAC control device is operating in an unoccupied mode.

In some embodiments, the method includes receiving, at the occupancy override control, a user input switching the occupancy override control from the non-override state to the override state, displaying the variable opacity region with a first predefined opacity, and activating the control region.

In some embodiments, the method includes receiving, at the occupancy override control, a user input switching the occupancy override control from the override state to the non-override state, displaying the variable opacity region with a second predefined opacity, and deactivating the control region.

In some embodiments the method includes visually highlighting the override region when the variable opacity region is displayed with a first predefined opacity.

In yet another exemplary embodiment of the present disclosure, a method of operating an HVAC control device having a touch-responsive display screen and scheduled occupancy states and non-occupancy states includes defining a portion of the display screen having setpoint change control panel, defining a portion of the display screen having an occupancy control panel, and detecting a transition of scheduled occupancy state. If it is detected that the occupancy state has transitioned to a non-occupied state, a visual opacity effect is applied to the portion of the screen having the setpoint change control panel, and, in some embodiments, a visual highlighting effect is applied to the occupancy control panel. In some embodiments, the opacity effect is applied to all portions of the screen except the occupancy change control panel. If it is detected that the occupancy state has transitioned to an occupied state, the visual opacity effect is removed from the setpoint change control panel, and the visual highlighting effect is removed from the occupancy control panel. In some embodiments, the method further includes disabling the setpoint change control panel when occupancy state has transitioned to a non-occupied state.

In some embodiments, the method further includes enabling the setpoint change control panel when occupancy state has transitioned to an occupied state. In some embodiments, the method further includes receiving a user input enabling an occupancy override mode and removing the visual opacity effect from the setpoint change control panel. In some embodiments, a visual highlighting effect is removed from the occupancy control panel.

In some embodiments, the method further includes receiving a user input disabling an occupancy override mode and applying the visual opacity effect to the setpoint change control panel. In some embodiments, a visual highlighting effect is applied to the occupancy control panel.

In another aspect the present disclosure is directed to an HVAC system that includes a thermostat or a system hub that performs a method of operation as described herein.

BRIEF DESCRIPTION OF THE DRAWINGS

Various embodiments of the disclosed system and method are described herein with reference to the drawings wherein:

FIGS. 2-8 illustrate a flexible scheduling user interface for adding events to an HVAC thermostat in accordance with an exemplary embodiment of the present disclosure;

Figure 1:
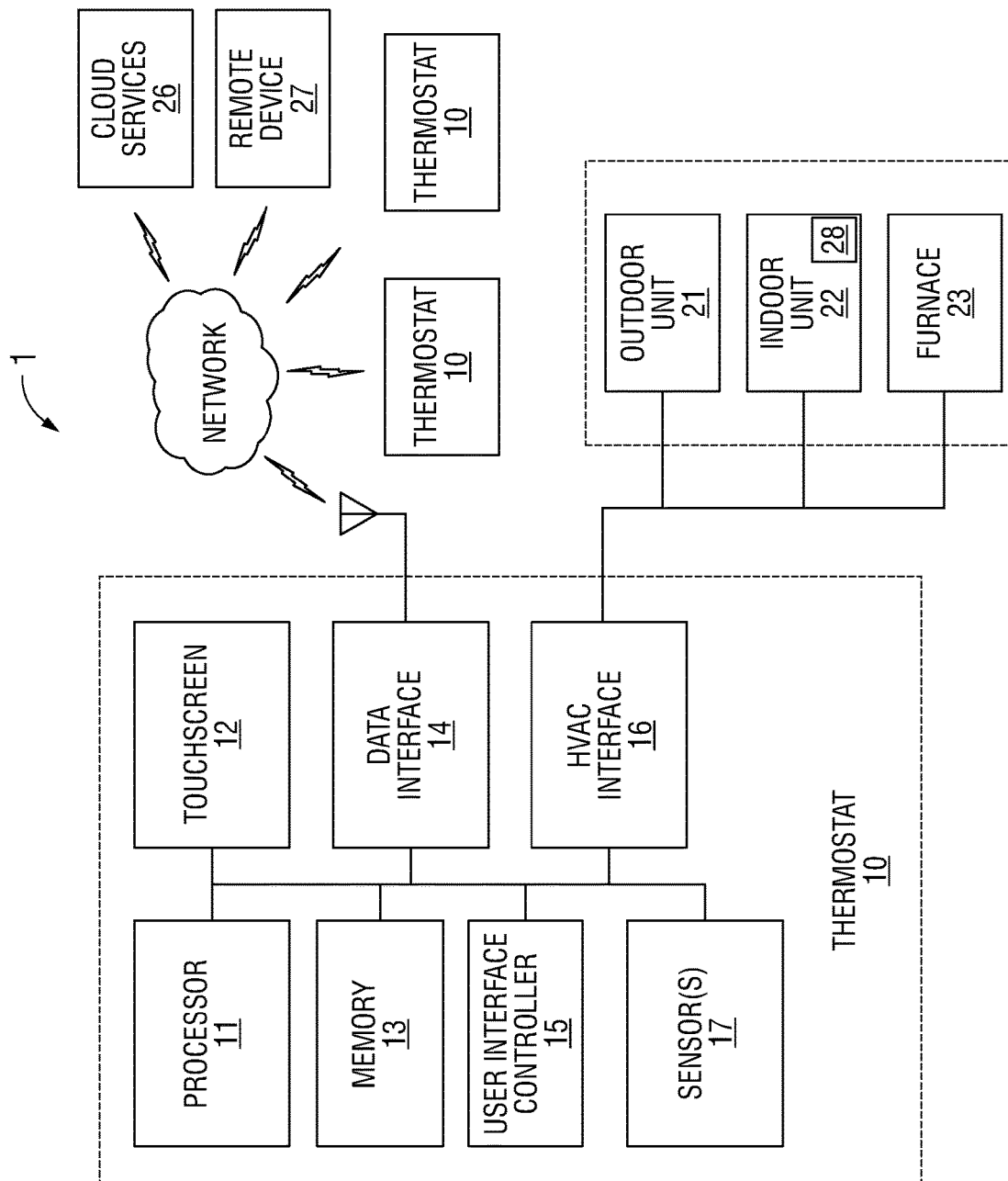
FIG. 1 illustrates an HVAC system having a thermostat with a flexible scheduling user interface in accordance with an exemplary embodiment of the present disclosure.

The various aspects of the present disclosure mentioned above are described in further detail with reference to the aforementioned figures and the following detailed description of exemplary embodiments.

DETAILED DESCRIPTION

Particular illustrative embodiments of the present disclosure are described hereinbelow with reference to the accompanying drawings; however, the disclosed embodiments are merely examples of the disclosure, which may be embodied in various forms. Well-known functions or constructions and repetitive matter are not described in detail to avoid obscuring the present disclosure in unnecessary or redundant detail. Therefore, specific structural and functional details disclosed herein are not to be interpreted as limiting, but merely as a basis for the claims and as a representative basis for teaching one skilled in the art to variously employ the present disclosure in any appropriately detailed structure. In this description, as well as in the drawings, like-referenced numbers represent elements which may perform the same, similar, or equivalent functions. The word "exemplary" is used herein to mean "serving as a non-limiting example, instance, or illustration." Any embodiment described herein as "exemplary" is not necessarily to be construed as preferred or advantageous over other embodiments. The word "example" may be used interchangeably with the term "exemplary."

Aspects of the present disclosure are described herein in terms of functional block components and various processing steps. It should be appreciated that such functional blocks configured to perform the specified functions may be embodied in mechanical devices, electromechanical devices, analog circuitry, digital circuitry, and/or modules embodied in a computer. For example, the present disclosure may employ various discrete components, integrated circuit components (e.g., memory elements, processing elements, logic elements, look-up tables, and the like) which may carry out a variety of functions, whether independently, in cooperation with one or more other components, and/or under the control of one or more processors or other control devices. It should be appreciated that the particular implementations described herein are illustrative of the disclosure and its best mode and are not intended to otherwise limit the scope of the present disclosure in any way. One skilled in the art will also appreciate that, for security reasons, any element of the present disclosure may consist of any combination of databases or components at a single location or at multiple locations, wherein each database or system includes any of various suitable security features, such as firewalls, access codes, authentication, encryption, de-encryption, compression, decompression, and/or the like. It should be understood that the steps recited herein may be executed in any order and are not limited to the order presented. Moreover, two or more steps or actions recited herein may be performed concurrently. In the discussion contained herein, the terms "touch" as used to indicate a user selection of a user interface element and/or button are understood to be non-limiting, and include other user interface activation techniques such as, without limitation, clicking, tapping, speech input, and the like.

In more detail, and with reference to FIG. 1, an example embodiment of an HVAC system 1 having a thermostat 10 with a flexible scheduling user interface is shown. Thermostat 10 includes in operative communication, processor 11, touchscreen 12, memory 13, data interface 14, user interface controller 15, HVAC interface 16, and one or more sensors 17. Sensor(s) 17 may include a temperature sensor, humidity sensor, light sensor, proximity sensor and/or a motion sensor. HVAC interface 16 is configured to communicatively couple thermostat 10 with HVAC equipment 20. HVAC equipment 20 may include, without limitation, an outdoor unit 21, an indoor unit 22, and/or a furnace 23. While in the example embodiment HVAC equipment 20 includes components typically associated with residential installations, the present disclosure is not so limited, and may be used with commercial HVAC components such as chiller plants, water-source heat pumps, and variable refrigerant flow devices. Data interface 14 is configured to communicably couple thermostat 10 with other devices, such as one or more additional thermostats 10, a remote device 27 such as a smart phone, tablet computer, notebook, or desktop computer, and/or cloud services 26 which may include one or more remote servers.

Data interface 14 may be configured to communicate using any suitable wireless communication protocol, such as without limitation, any variant of IEEE 802.11 (commonly known as WiFi), variants of IEEE 802.15 wireless personal area networking such as Bluetooth® and ZigBee®, and other wireless standards such as Z-Wave®. Data interface 14 may be additionally or alternatively be configured to communicate using a wired protocol using dedicated data lines (e.g., Ethernet) or via powerline communication links using, for example, IEEE 1901, X10® and/or Insteon® protocol.

Data interface 14 may be additionally or alternatively be configured to communicate using a cellular mobile network using, for example and without limitation, a GSM protocol (3G, 4G, LTE etc.), a CDMA protocol (EV-DO, SV-DO, etc.), and so forth. In embodiments, data interface 14 is configured to act as a WiFi hot-spot or wired router to enable thermostat 10 to provide internet access via the cellular data network to other internet-enabled devices within the building, such as computers, notebooks, mobile devices, streaming media devices, security devices, appliances, and so forth.

HVAC interface 16 may be configured to communicate between thermostat 10 and HVAC equipment 20 using any communications protocol suitable for use with HVAC equipment 20. For example, and without limitation, where indoor unit 21, outdoor unit 22, and/or furnace 23 employ single- or dual-speed motors, HVAC interface 16 may include a 24V switched circuit interface which operates with well-known HVAC color-coded wiring schemes (Rc, Rh, C, Y, W, Y2, W2, G, E, O, V, etc.). Where indoor unit 21 and/or outdoor unit 22 employ variable-speed motors, HVAC interface 16 may include a digital signaling interface such as, without limitation, CAN bus, RS-485, ComfortLink II™, ClimateTalk™, and the like. In embodiments, HVAC interface 16 may operate using both 24V switched circuits and digital signaling protocols to flexibly accommodate any combination of HVAC equipment. In some embodiments, any of the functions of data interface 14 may be performed by HVAC interface 16, and vice versa. In embodiments, HVAC interface 16 may be incorporated within data interface 14.

Thermostat 10 is configured for communication with one or more remote devices 27, cloud services 26, and or other thermostats 10 via network 26 (which may include a LAN and/or the public internet).

In some embodiments, outdoor unit 21 and indoor unit 22 may be configured as a split HVAC system wherein outdoor unit 21 is configured as an air conditioner or heat pump unit, and indoor unit 22 is configured as an air handling unit. In other embodiments, outdoor unit 21 and indoor unit 22 may be included within a common enclosure. In some embodiments, outdoor unit 21 and/or indoor unit 22 may include an auxiliary heater 28 for use when a heat pump alone is insufficient to meet the heating demand of the building or temperature-controlled space. HVAC equipment 20 may include a furnace 23 configured for heating the building via combustion of heating oil (typically, No. 2 heating oil), liquid propane (LP), or other fuel such as liquefied natural gas (LNG), that is stored on-site.

Thermostat 10 includes user interface controller 15 which in combination with touchscreen 12 implements one or more embodiments of a flexible scheduling thermostat user interface as described herein. As will be appreciated by one of ordinary skill in the art, aspects of the present disclosure, including but not limited to user interface controller 15, may take the form of an entirely software embodiment, an entirely hardware embodiment, or an embodiment combining both software and hardware. Embodiments may take the form of a computer program product on any suitable non-transitory computer-readable storage medium having computer-readable program code embodied in the storage medium. Any suitable computer-readable storage medium may be utilized, including semiconductor storage devices, e.g., mask ROM, EEPROM, flash memory, USB thumb drives, and the like. Computer program instructions embodying the present disclosure may be stored in a computer-readable memory that can direct a computer or other programmable data processing apparatus to function in a particular manner, such that the instructions stored in the computer-readable memory produce an article of manufacture, including instruction means, that implement the functions described herein.

Figure 2:
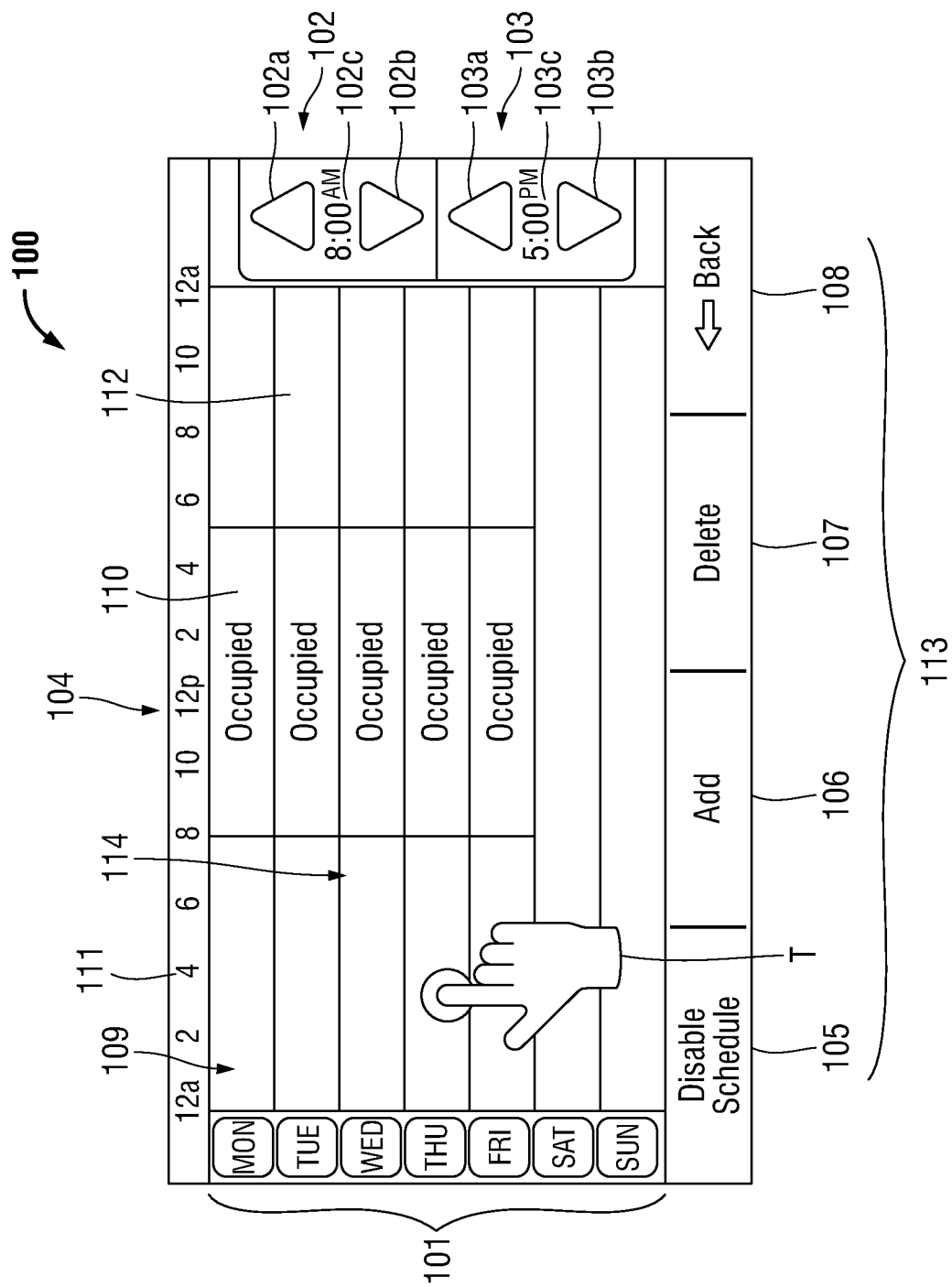

Referring now to FIGS. 2-8, a flexible scheduling user interface 100 for adding events to HVAC thermostat 10 is shown. In FIG. 2, user interface is in a display configuration. User interface 100 includes a scheduling grid 114 consisting of one row 109 for each day of the week, each row representing a 24 hour timeline of that day. A column of day buttons 101 is arranged vertically down the left side of user interface 100 that are each associated with a corresponding row 109. Each of the rows 109 may include occupied periods 110 and unoccupied periods 112 scheduled for each day. An occupied period 110 may denote, for example, that the thermostat 10 will operate in accordance with an occupied environmental profile during that event. Arranged horizontally above the rows 109 is a 24-hour timeline header 104 that includes a series of hour markers 111 that, in the present example embodiment, indicate the hours of the day in two-hour intervals. A set of time adjustment controls is arranged at the right side of user interface 100. A start time adjustment control 102 includes a pair of buttons 102a and 102b for increasing and decreasing, respectively, the start time of one or more selected events. An end time adjustment control 103 includes a pair of buttons 103a and 103b for increasing and decreasing, respectively, the end time of one or more selected events. Start time adjustment control 102 includes a start time display 102c and end time adjustment control 103 includes an end time display 103c. A set of command buttons is situated along the bottom of user interface 100 that includes an add button 106, a delete button 107, a disable schedule button 105, and a back button 108.

Occupied periods 110 and unoccupied periods 112 are distinguished visually by the use of different colors or shading and/or by the use of text labels or graphic icons. In the present example embodiment, occupied periods 110 are presented in a color that is different from that of unoccupied periods 112. Additionally, occupied regions 110 may include a text label, e.g., "Occupied."

To add period, a user has a choice of using one of two different gestures to enter add mode to allow the addition of an event to the thermostat 10 schedule. To enter add mode using the first method, a user may touch the add button 106. Alternatively, the user may enter add mode by using the second method of touching any unscheduled period 112 (as demonstrated in the drawings by the "touch" symbol T).

Figures 3, 4:
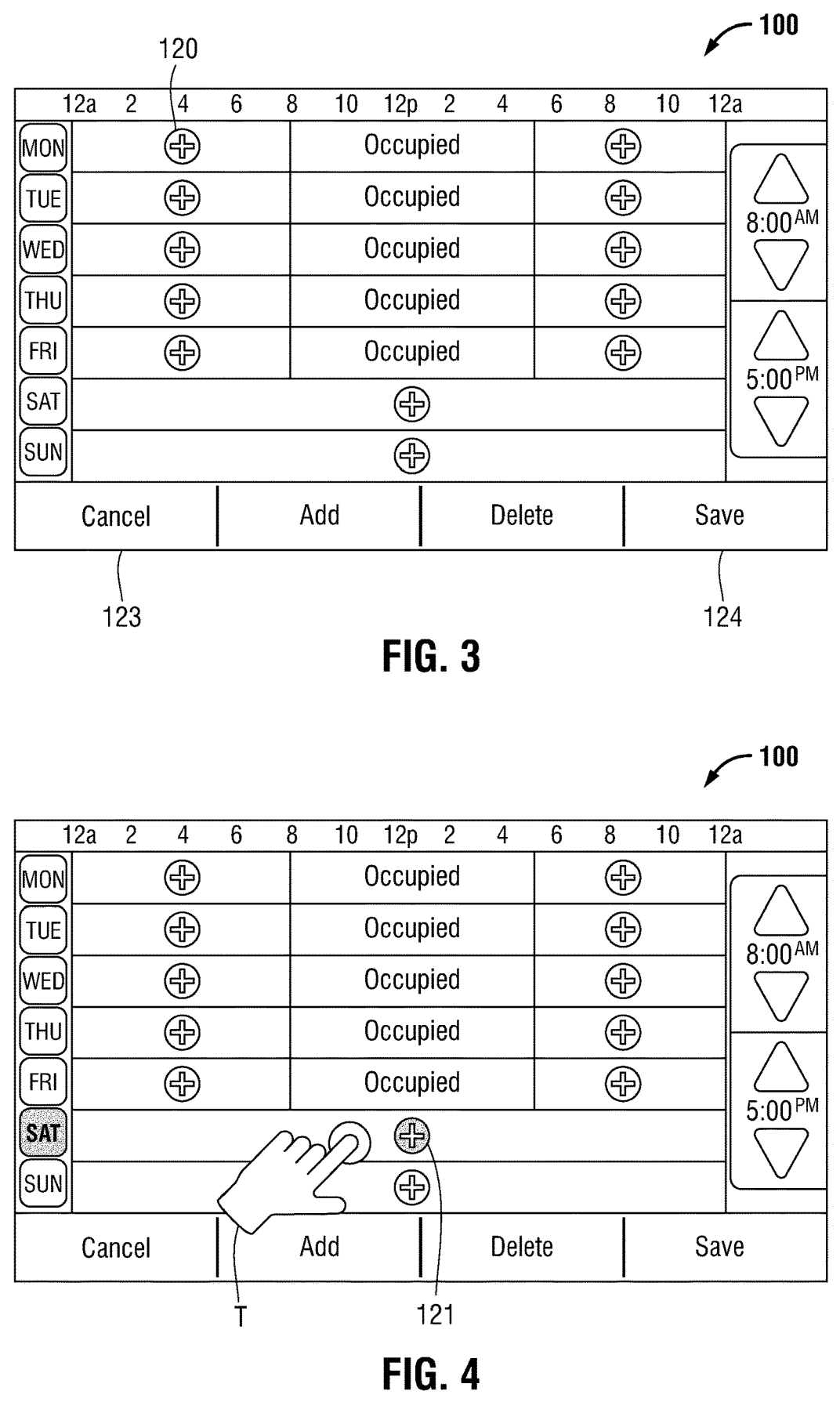

Turning to FIG. 3, user interface 100 is transitioned from display mode to add mode. Addition of events (e.g., occupancy periods) is now possible as indicated by the presentation of one or more addition buttons 120, which, as seen in the present example embodiment, are represented by a plus sign within a circle. Additionally, a cancel button 123 and a save button 124 are presented in place of disable schedule button 105 and back button 108, respectively, and add button 106 and delete button 107 are disabled (greyed out). Upon entry into edit mode, an addition button 120 is placed in each unoccupied period, in the following manner: an addition button 120 is placed to the left of an occupied period; an addition button 120 is placed to the right of an occupied period; each addition button 120 is centered within the unoccupied period in which it is placed and/or is centered between occupancy period when placed in an unoccupied period between two occupancy period. The active area of the addition button 120 may include the area within the button itself, and/or may extend to include the region defined by the unoccupied period in which the addition button 120 is placed. As shown in FIG. 4, to add an event, the user touches the active area of the addition button 120 in the unoccupied period in which the new event is to be created. For example, a user touches the unoccupied region 121, which in this example is the entirety of Saturday.

Figure 5:
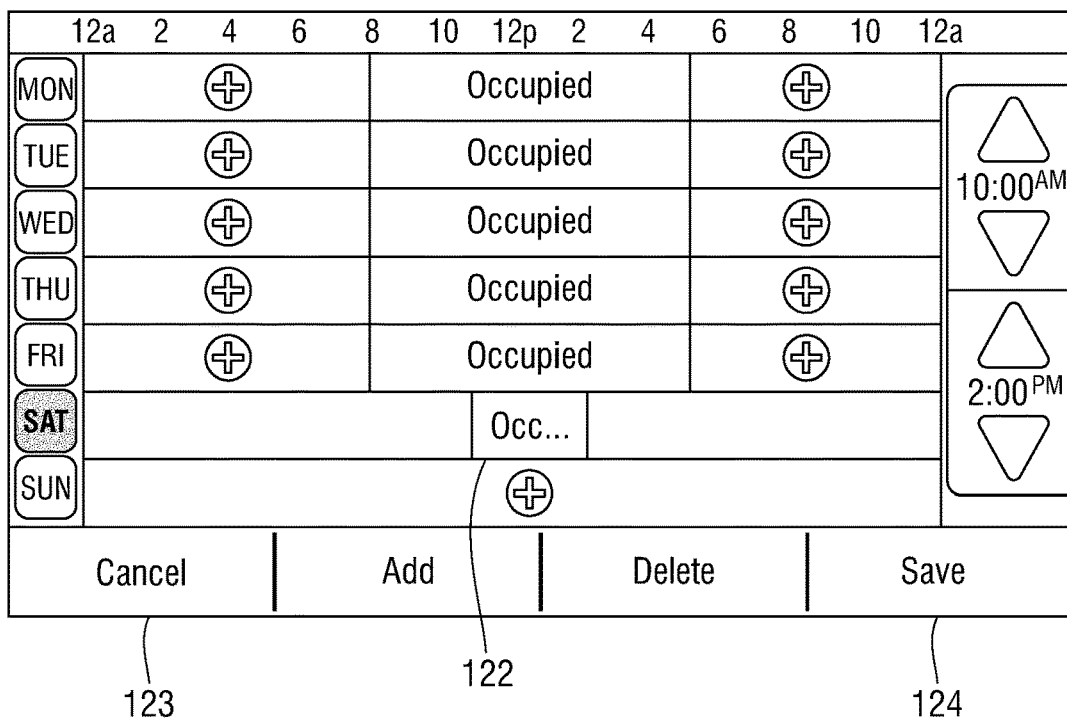

With reference now to FIG. 5, once the user touches the desired unoccupied period in which to create the new occupied period, a new occupancy period 122 is created in the desired region. In the present example embodiment, new occupancy period 122 has an initial (default) duration of three hours. In those instances where the desired unoccupied period is less than three hours, the initial duration of new occupancy period 122 is decreased to fit the time within the desired unoccupied region.

Figure 6:
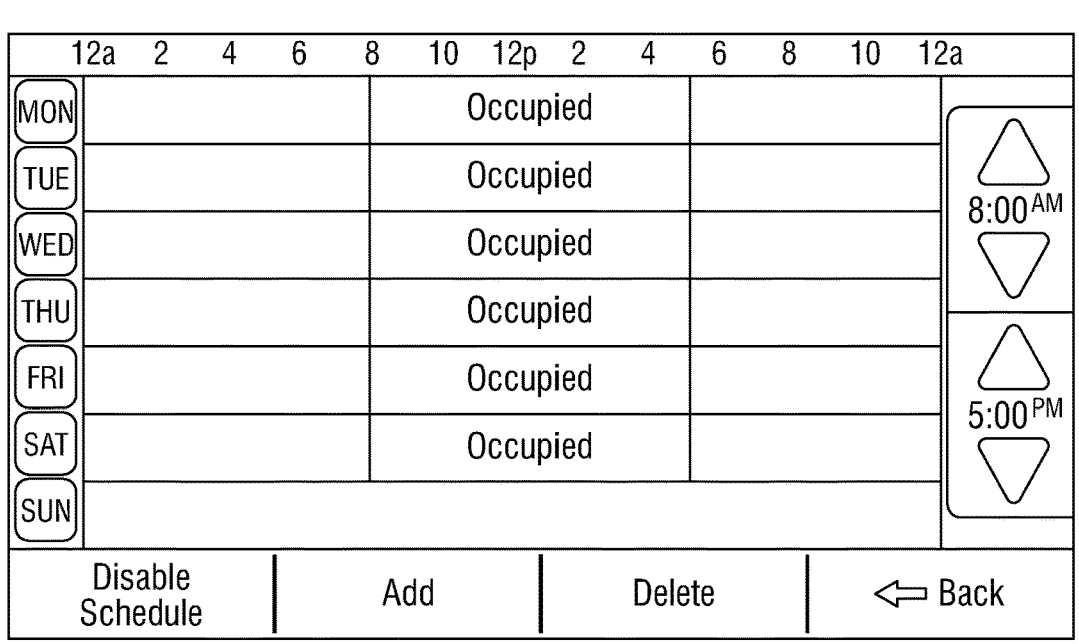
Figure 9:
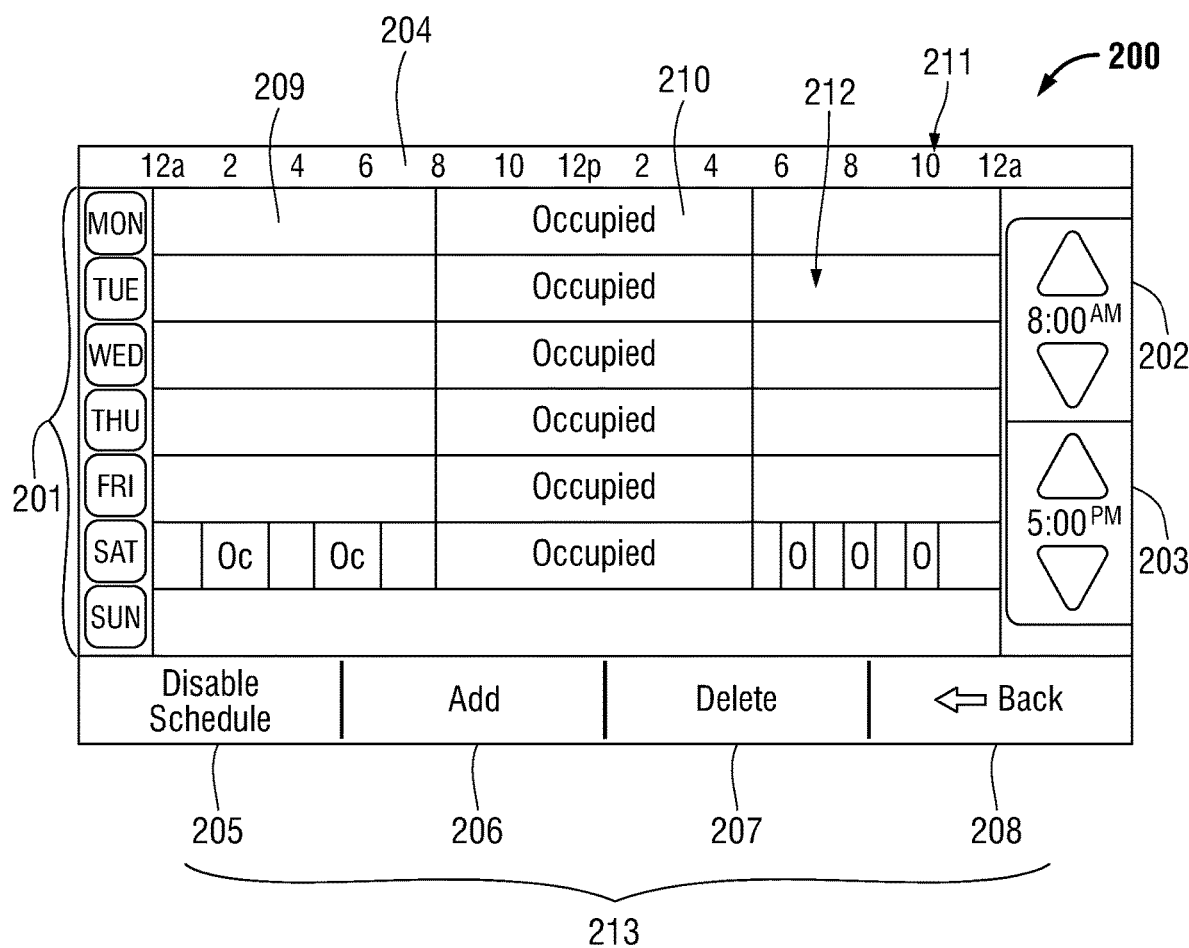
FIGS. 9-13 illustrate a flexible scheduling user interface for deleting events from an HVAC thermostat in accordance with an exemplary embodiment of the present disclosure.

With continued reference to FIG. 6, once new occupancy period 122 is created, it becomes the active selection which, in turn, enables a user to adjust the start and/or end time thereof using start time adjustment control 102 and/or end time adjustment control 103. Once a user is satisfied with the settings of new event 122, the user has three choices. The user may continue to add events by repeating the above process (e.g., touching another unoccupied period); the user may touch save button 124 to save the newly-added period (s); or the user may touch cancel button 123 to discard any changes and return the schedule to its prior state. If the save button 124 is used, user interface 100 returns to the display configuration showing the newly-added period(s) (FIG. 6.) If cancel button 123 is used, user interface 100 returns to the display configuration showing the prior set of period(s) (FIG. 2.)

Figures 7, 8:
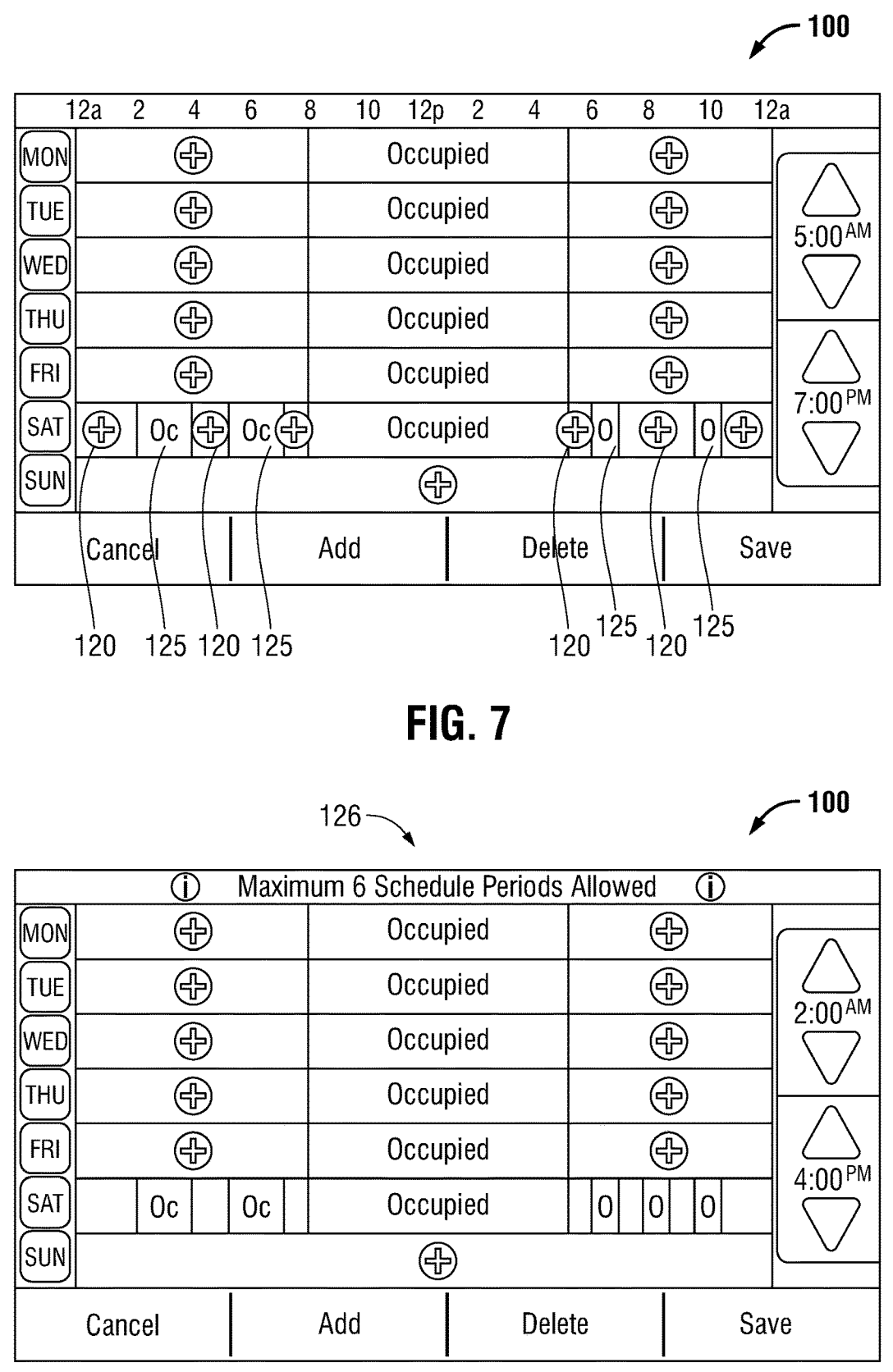

Continuing with the FIG. 5 example, the disclosed user interface 100 supports the creation of multiple periods in a given day. As shown in FIG. 7, user interface 100 is in add mode and a user has added four additional occupancy periods 125 on Saturday. While in add mode and upon the creation of a new period, user interface 100 places additional add buttons 120 in each unoccupied period (e.g., between occupied periods), in the manner described above. In some embodiments, a minimum unoccupied period may be enforced between occupied periods. In some embodiments, the minimum unoccupied period is 30 minutes. In some embodiments, the number of occupancy periods permitted on a given day may be limited. As shown in the FIG. 8 example, a "maximum number of periods" error message 126 is presented on user interface 100 when an attempt to exceed the maximum daily event limit occurs. In some embodiments, the maximum number of periods permitted on a given day is six events.

Figure 10:
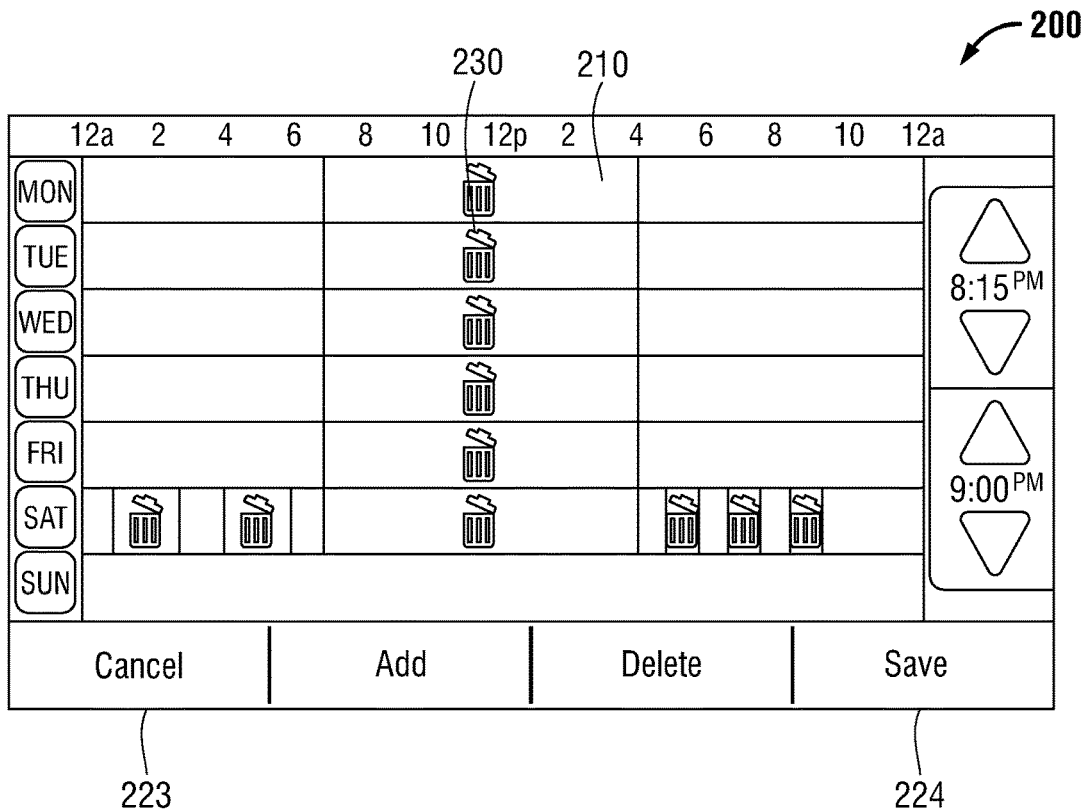

In FIGS. 9-13 a flexible scheduling user interface 200 for deleting events from HVAC thermostat 10 is shown. User interface 200 includes day buttons 201, rows 209, timeline header 204, hour markers 211, time adjustment controls 202, 203 and may display occupied events 210 and unoccupied events 212 as described above. To enter delete mode, a user touches delete button 207 to cause user interface 200 to transition from a display mode (FIG. 9) to a delete mode (FIG. 10). Delete mode is indicated by the substitution of the "Occupied" label(s) on occupied event(s) 210 by a deletion icon 230, which in the present example is a trash can icon. In other embodiments, the "Occupied" text label may be substituted with a different text label, for example, "Delete This Event" or the like. Additionally, when user interface 200 is in delete mode, cancel button 223 and save button 224 are presented in place of disable schedule button 205 and back button 208, respectively, and add button 206 and delete button 307 are disabled (greyed out).

Figure 11:
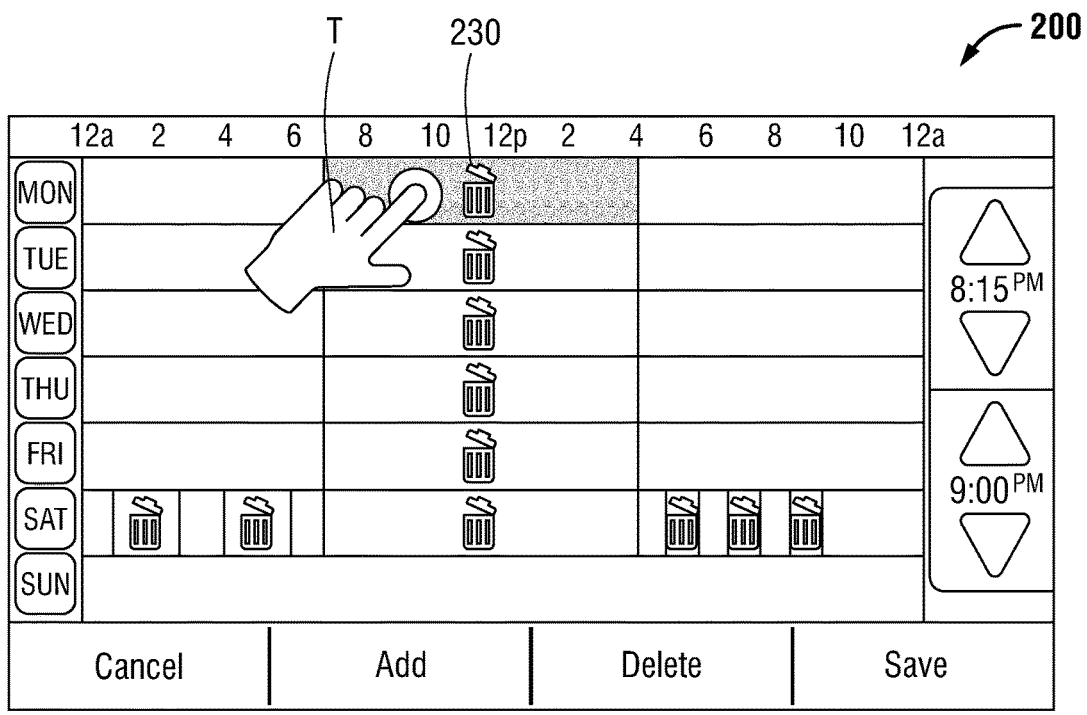
Figure 12:
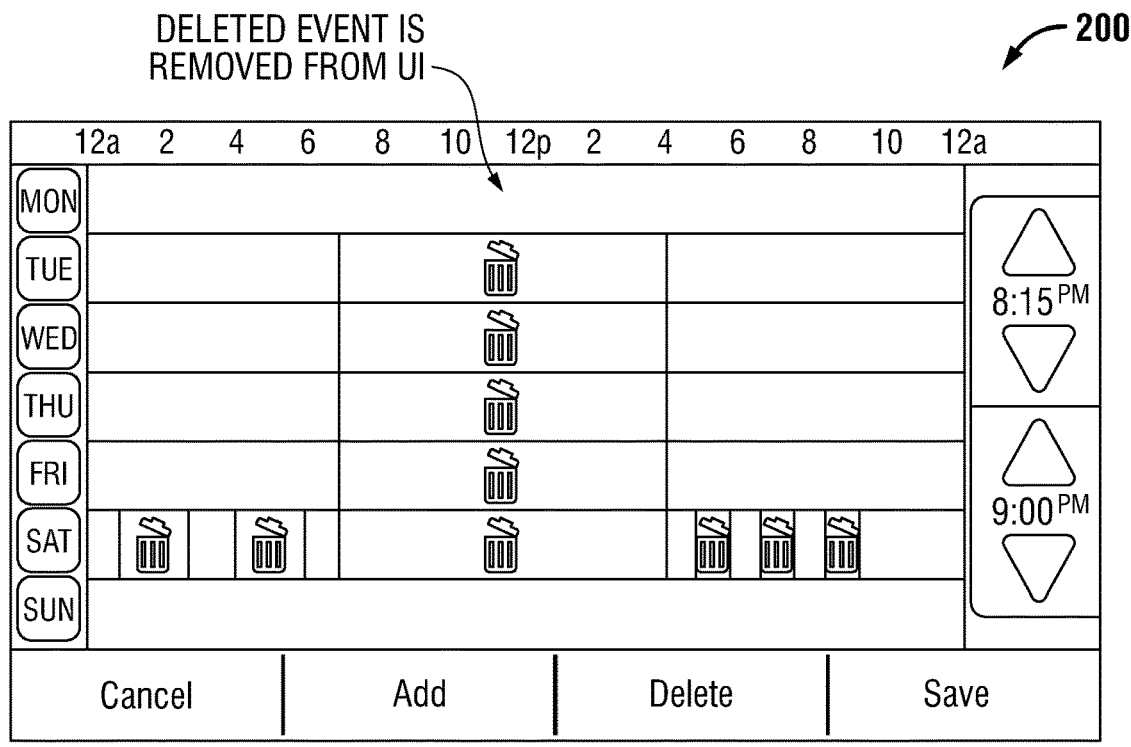
Figure 13:
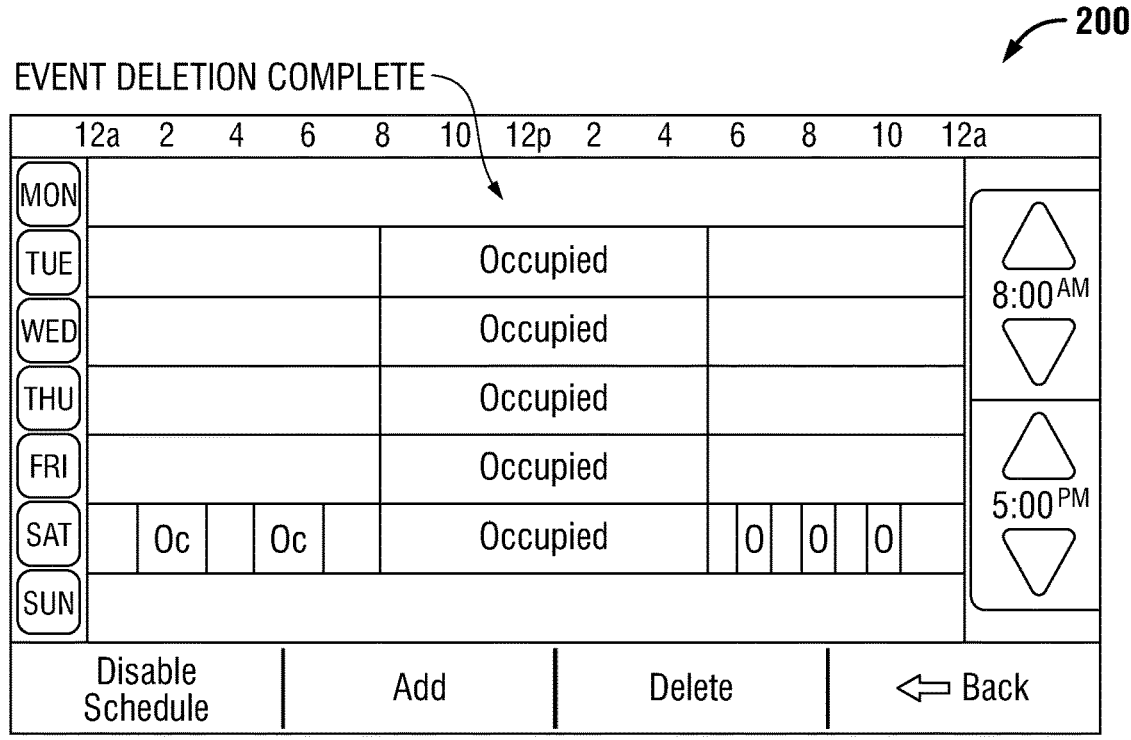

To delete an event, the user touches the deletion icon 230 of the period to be deleted as shown in FIG. 11. In some embodiments, the user may simply touch anywhere within the period to be deleted. In response, the deleted period is removed from user interface 200 (FIG. 12). The user may continue to delete additional periods in the described matter. Once the user is satisfied with the deletions, the user may confirm the deletions by touching save button 224 which deletes the selected events and returns user interface 200 to the display mode (FIG. 9) where the add button 206 and delete button 207 are re-activated and the disable schedule button 205 and back button 208 return to their original state. Alternatively, if the user does not wish to confirm the deletions, cancel button 223 is touched, which restores any deleted periods to the state immediately preceding delete mode, and returns user interface 200 to display mode.

Figure 14:
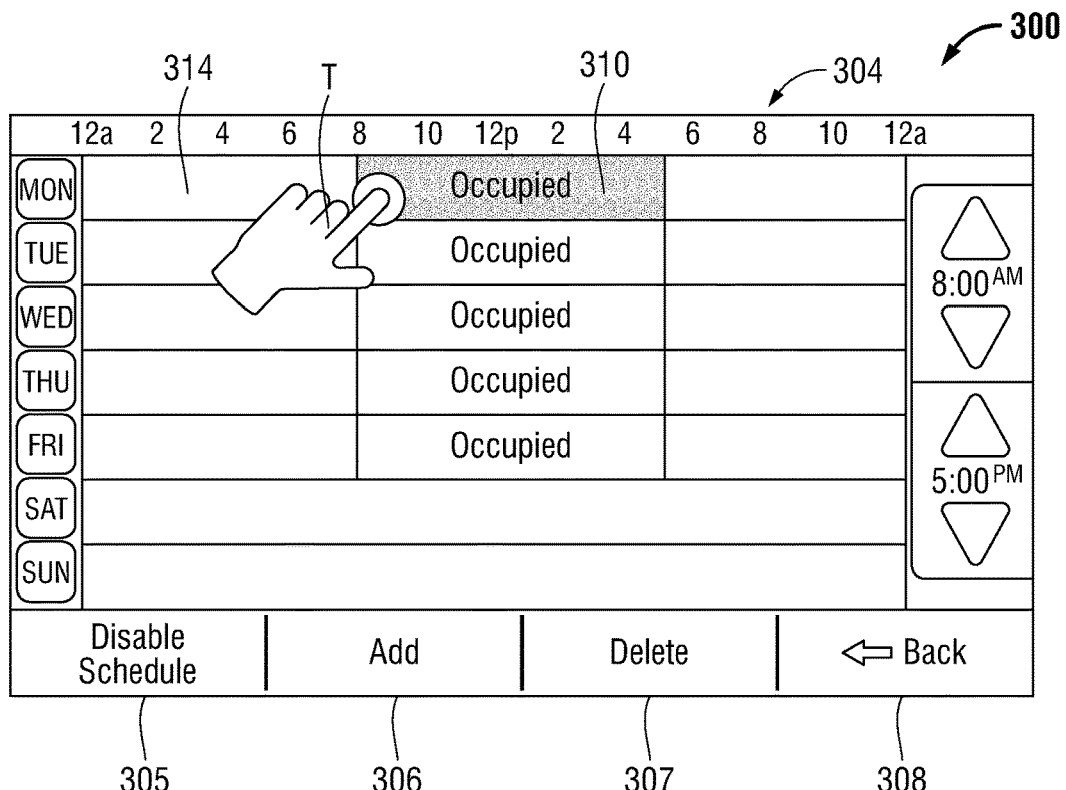
FIGS. 14-17 illustrate a start- and end-time grid of a flexible scheduling user interface for modifying events in an HVAC thermostat in accordance with an exemplary embodiment of the present disclosure.
Figure 15:
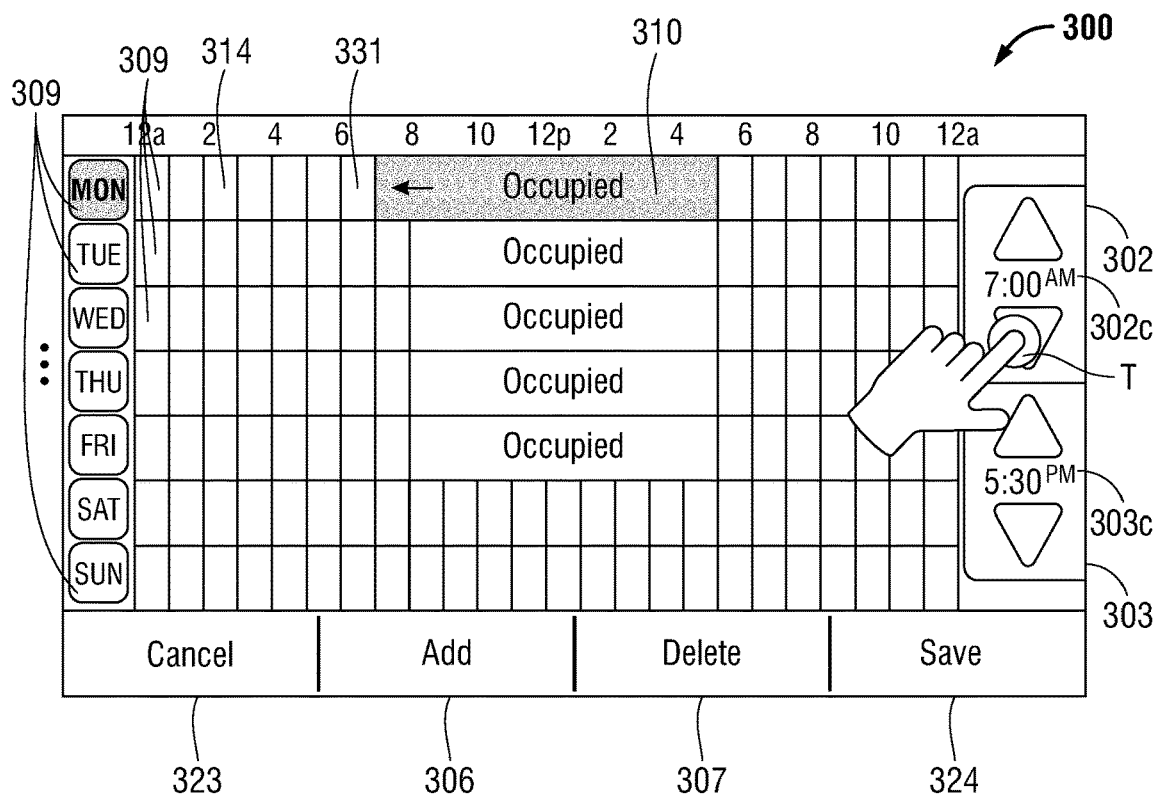
Figure 16:
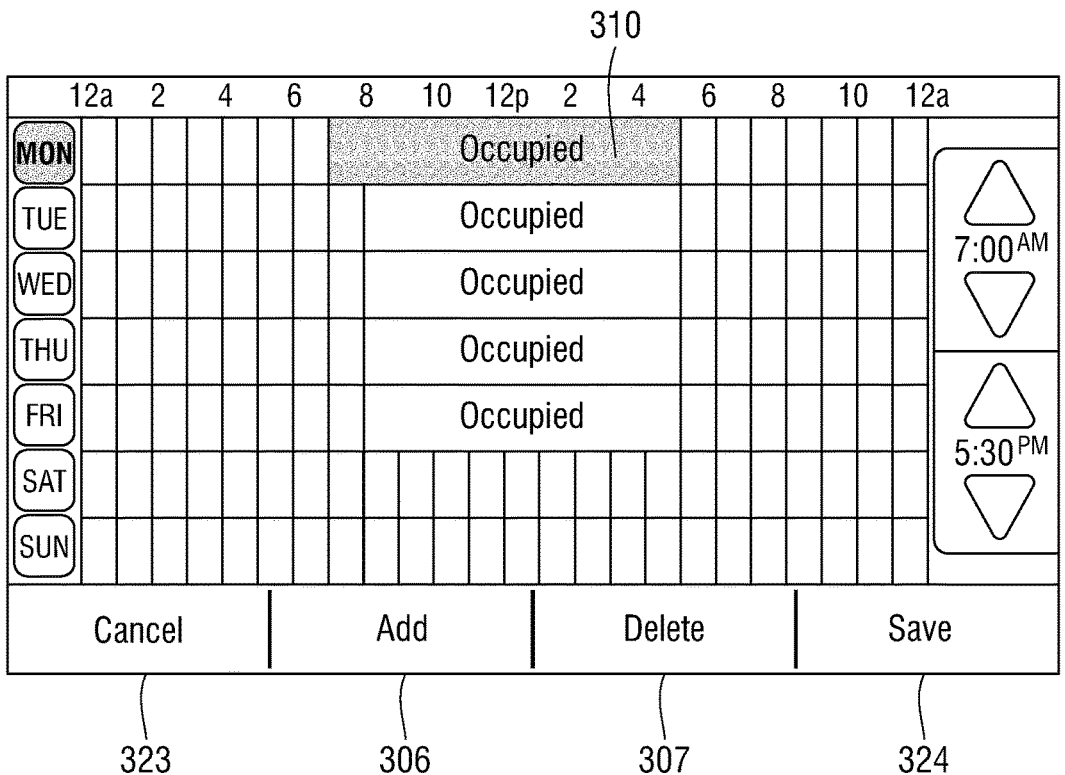

In FIGS. 14-17 another aspect of the present disclosure is shown that exemplifies a flexible scheduling user interface 300 for modifying events 310 of HVAC thermostat 10. User interface 300 includes a scheduling grid 314 consisting of one row 309 for each day of the week, each row representing a 24 hour timeline of that day. To enter modify mode, the user touches (T) a region within the event 310 to be modified as shown in FIG. 14. Upon touching the desired event 310, the touched event is selected for editing as highlighted by a change in color or other graphic property (e.g., change in background pattern, blinking, animation, etc.). Substantially concurrently therewith, a series of vertical time alignment lines become visible on scheduling grid 314 to create a visible alignment grid 331, the disable schedule button 305 and back button 308 are replaced by cancel button 323 and save button 324, respectively, and the add button 306 and delete button 307 are deactivated (unhighlighted, grayed-out etc.) as shown in FIG. 15.

To adjust the start and end time(s) of the selected event, the user may adjust the start and/or end time thereof using start time adjustment control 302 and/or end time adjustment control 303. In the example embodiment shown in FIGS. 14-16, the user touches the down-arrow of start time adjustment control 302 to change the start time of event 310 from 8:00 a.m. to 7:00 a.m. Advantageously, the visible alignment grid 331 enables the user to quickly visually perceive the time period of the event and how it aligns to the 24 hour banner 304 and other individual period(s). The vertical lines of the alignment grid 331 align with the 24 hour header 304 by hourly increments, allowing the user to quickly match the event period to the desired hour, without having to confirm the start and end time(s) by needing to move the user's hand away from start time adjustment control 302 and/or end time adjustment control 303 to read start time display 302c and/or end time display 303c.

Figure 17:
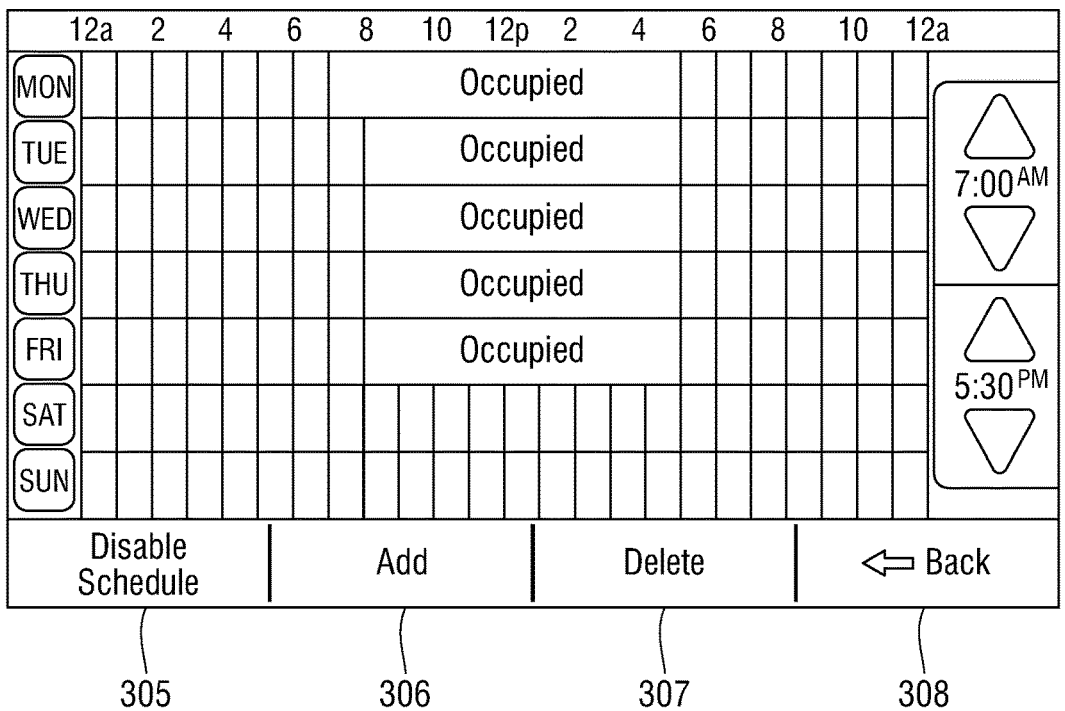

Once a user is satisfied with the modified settings of event 310, the user has three choices. The user may continue to modify events by repeating the above process (e.g., touching a region within another event and adjusting start/end times); the user may touch save button 324 to save the modified event(s); or the user may touch cancel button 323 to discard the modifications and return the schedule to its prior state. If the save button 324 is used, user interface 300 returns to the display configuration showing the newly-added event(s) (FIG. 17.) If cancel button 323 is used, user interface 300 returns to the display configuration showing the prior set of event(s) (FIG. 14.)

In another aspect of the present disclosure, thermostat 10 may be operated in a restricted mode where user interactions are limited or disallowed altogether. For example, during a scheduled unoccupied mode, user restrictions may be imposed on thermostat 10 which prevent the user from changing the occupancy schedule, setpoints, etc. In certain cases, however, it may be desirable to allow the user to make certain adjustments. For example, when thermostat 10 is operating in a scheduled mode, a user restriction prevents the user from adjusting the setpoint (e.g., change the temperature setting) unless an override option, referred to as a timed occupancy override (TOV) option, is enabled. In prior art systems, a novice user who, during a scheduled period, wishes to make a setpoint adjustment, might attempt to change setpoints directly without enabling TOV, or, may not have authorization to enable TOV. Since the user fails to recognize that TOV must be enabled to properly adjust thermostat 10, the user may end up causing improper or inadvertent changes to setpoint, scheduled events, and/or other settings as the user attempts to work around the perceived difficulty.

Figure 18:
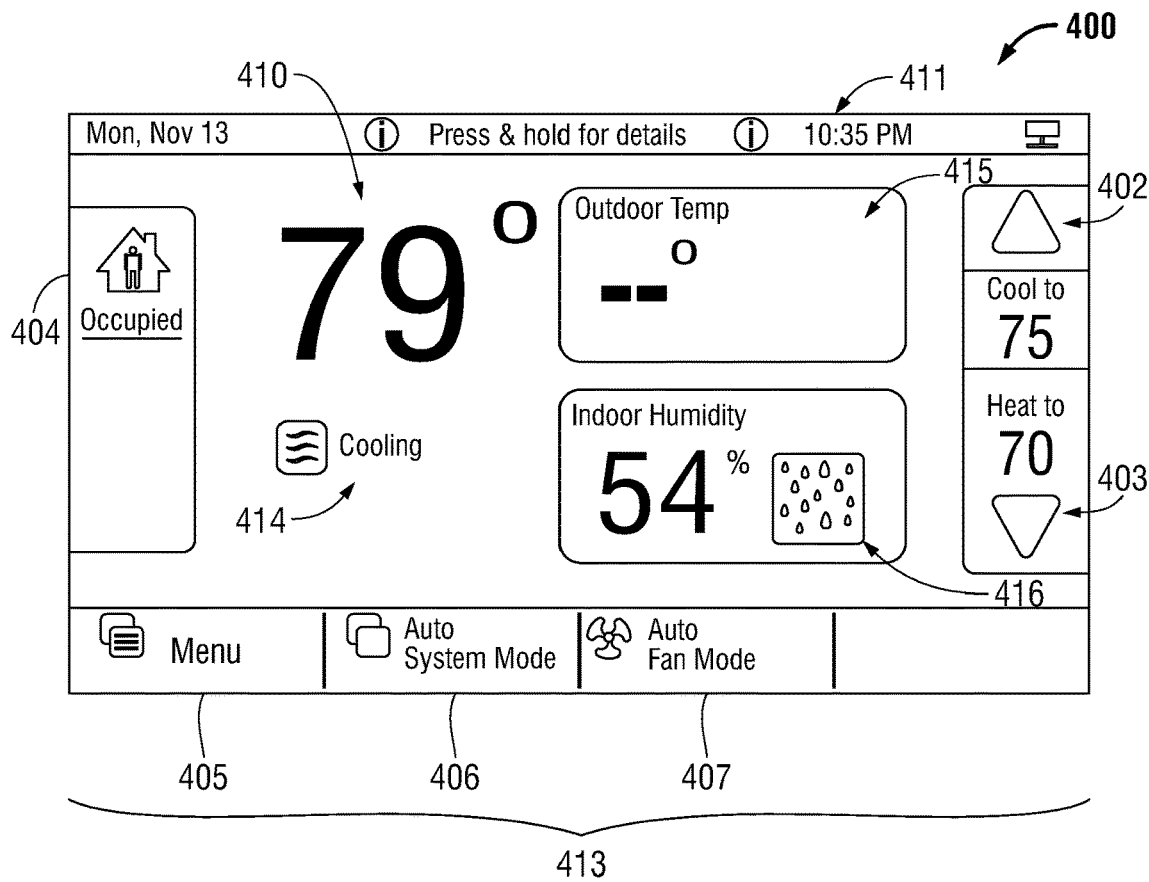
FIGS. 18-19 illustrate a flexible user interface of an HVAC thermostat that includes regions of varying opacity in accordance with an exemplary embodiment of the present disclosure.
Figure 19:
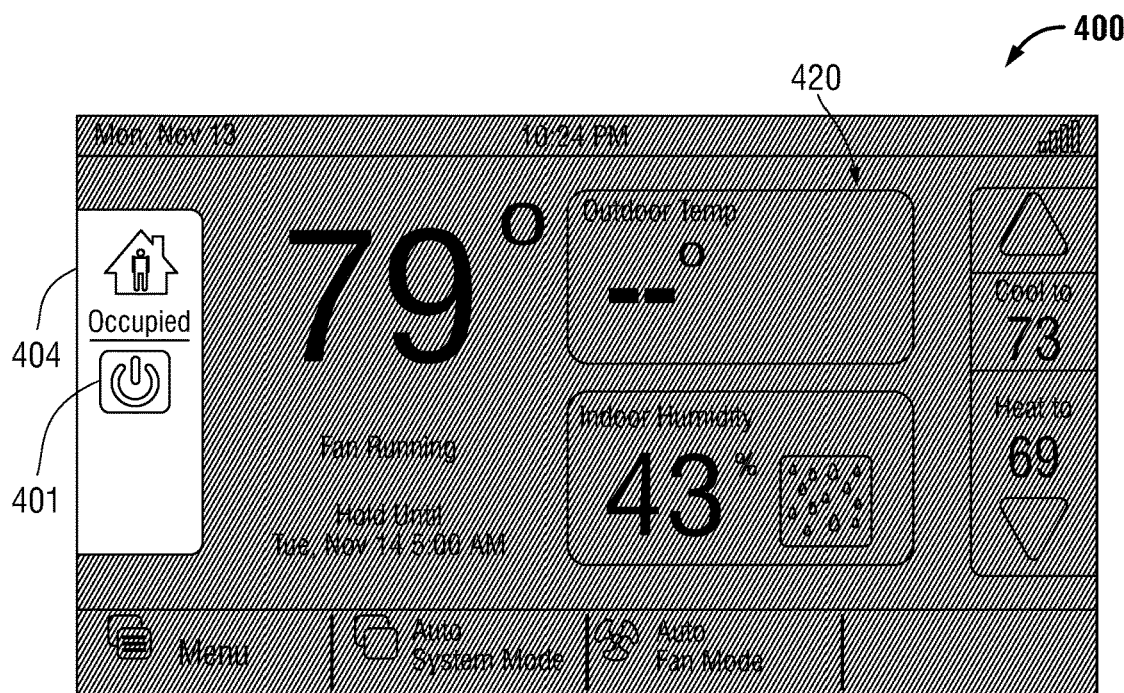

Turning now to FIGS. 18-19, these shortcomings are addressed by user interface 400 that permits a user to adjust setpoints when a user restriction is imposed and timed occupancy override (TOV) option is enabled by guiding the user toward available and appropriate settings and reducing or eliminating the likelihood that an inappropriate setting is changed.

FIG. 18 shows a user interface 400 that includes a header region 411 that includes informational displays such as date, time, and signal strength, current temperature display 410, HVAC system status display 414, outdoor temperature display 415 (when outdoor temperature is available) and indoor relative humidity display 416. User interface 400 also includes setpoint up/down buttons 402 and 403, respectively, and a lower control region 413 that includes menu button 405, system mode button 406, and fan mode button 407. The current scheduling mode, e.g., occupied or unoccupied, is displayed in timed occupancy override control 404. Note that in FIG. 18, no user restrictions are imposed (e.g., thermostat 10 is not in unoccupied schedule mode) and all controls, particularly the setpoint up/down buttons 402 and 403, are available to the user.

In FIG. 19, user interface 400 is illustrated with a user restriction imposed (e.g., unoccupied schedule mode). In this mode, a predefined opacity region 420 is overlaid on all portions of user interface 400 excluding the region defined by timed occupancy override (TOV) control 401 and occupancy panel 404. The opacity region 420 may include a representation of the underlying user interface elements using any one or more of a reduced contrast, a reduced brightness, a distinct or subdued coloration, or any other suitable visual attribute suggestive of reduced importance. The region defined by TOV control 401 and occupancy panel 404 remains unchanged, or alternatively, may be presented with any one or more of an increased contrast, increased brightness, a distinct or intensified coloration, or any other suitable visual attribute suggestive of increased importance. The opacity region 420 assists the user to properly navigate user interface 400 by enabling the user to quickly identify the TOV control 401, by suggesting to the user to utilize the TOV control 401 to adjust setpoint, and by indicating to the user that other controls that are available are of less significance when compared to TOV control 401 and/or occupancy panel 404. In some embodiments, one or more controls overlaid by opacity region 420 remain active to enable the user to continue to perform operations, such as, for example, navigating to other screens. However, thermostat 10 will still continue to follow access restrictions rules while the predefined screen opacity 420 is active, and will continue to display all system-related notifications and status displays (time, temperature, etc.) while predefined screen opacity 420 is active.

Figure 20:
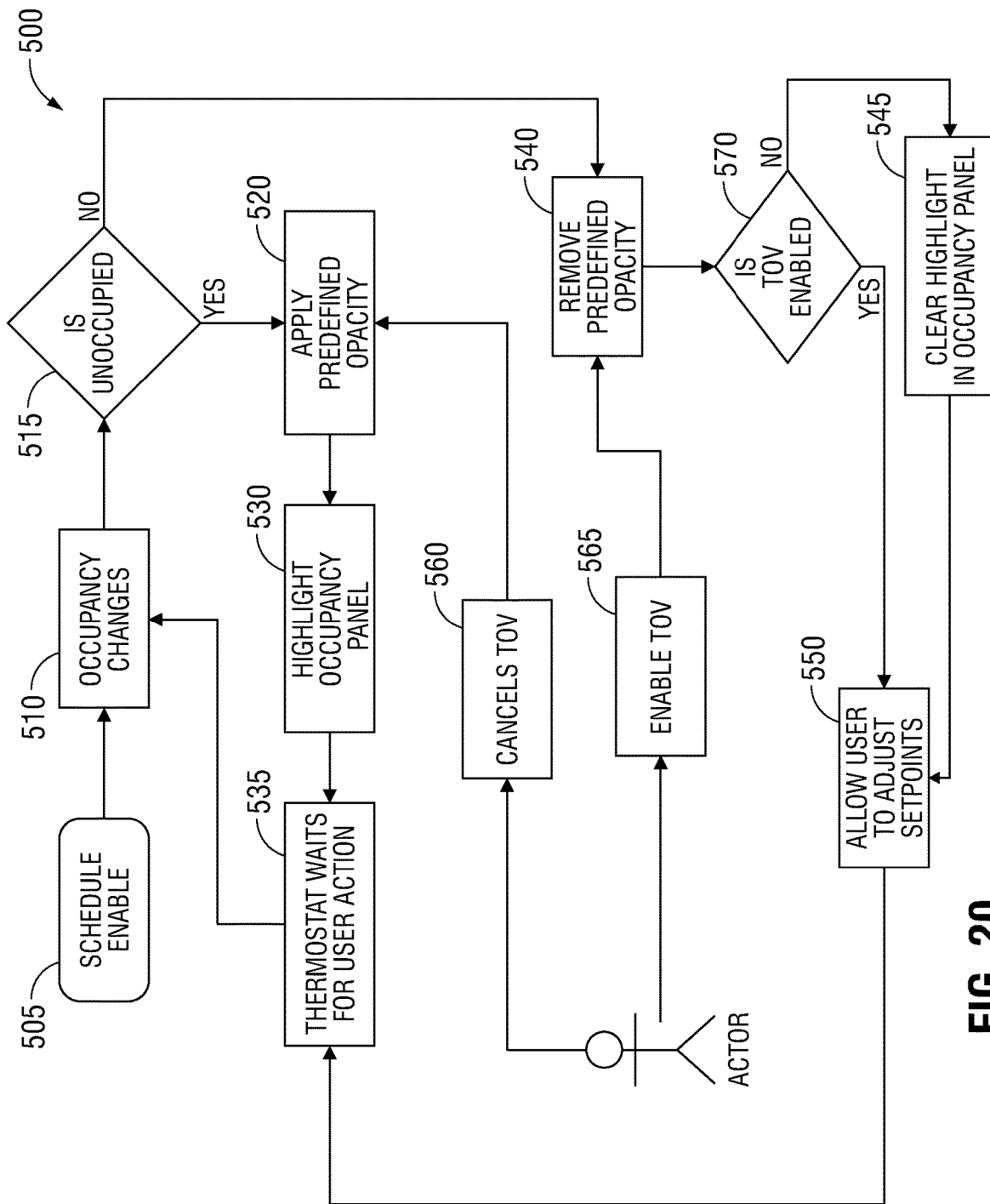
FIG. 20 illustrates a method of operating a flexible scheduling thermostat responsive to timed occupancy override status and occupancy status.

A method 500 by which user interface 400 responds to TOV and occupancy status during scheduled operation is detailed in FIG. 20. At block 505, scheduled operation is enabled. At block 510, a scheduled event occurs, e.g., a transition from occupied status to unoccupied status, or vice versa. At block 515, the occupancy status is evaluated. If unoccupied, the process continues at block 520 where the opacity region 420 is applied to user interface 400, and proceeds to block 530 where the TOV control 401 and/or occupancy panel 404 is highlighted. The process then waits at block 535 to receive the next user input.

If, at block 515, the occupancy status is determined to be occupied, the process continues at block 540 where the opacity region 420 is removed from user interface 400, and proceeds to block 570 where TOV state is evaluated. If TOV is disabled, block 545 is performed where TOV control 401 and/or occupancy panel 404 is unhighlighted. If in block 570 it is determined that TOV is enabled, block 545 is bypassed. Processing then continues at block 550 where setpoint adjustments 402, 403 are enabled allowing the user to adjust the setpoint as desired, and the process continues at block 535 to receive the next user input.

A user may have authorization to enable or disable timed occupancy override (TOV) mode. If so authorized, the user may at step 565 enable TOV mode, causing the process to proceed from block 540 as described above. Alternatively, the user may at step 560 cancel TOV mode, causing the process to proceed from block 520 as described above.

Figure 21:
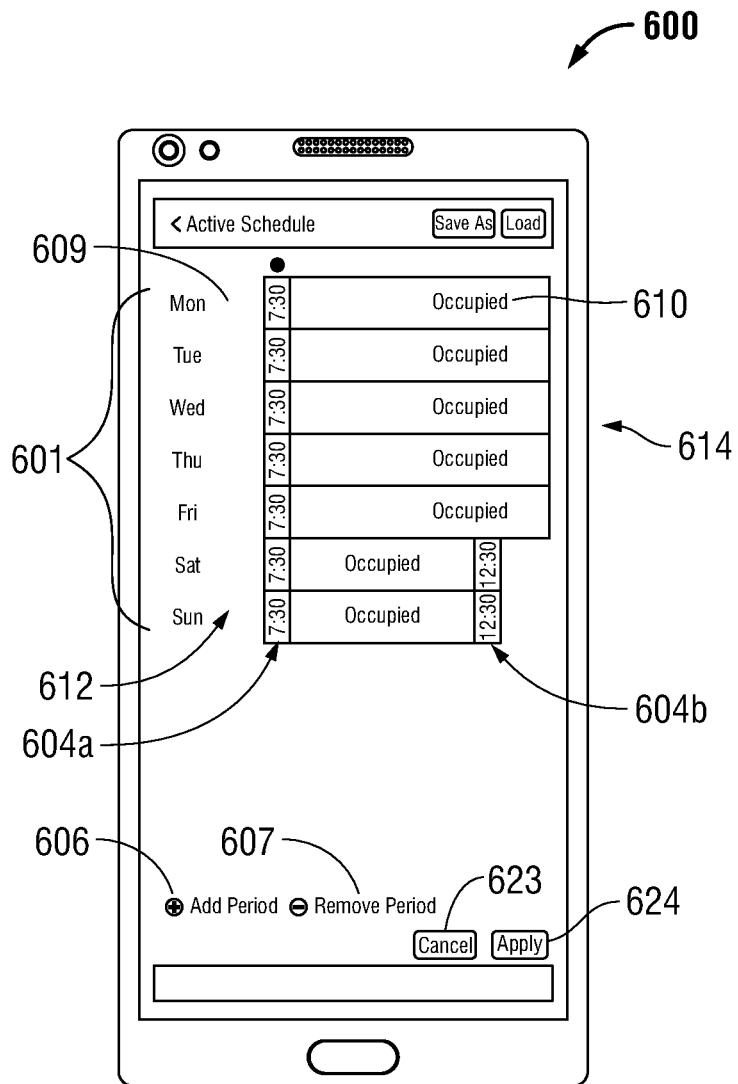
FIGS. 21-27 illustrate a remote flexible scheduling user interface for use with one or more HVAC thermostats that facilitates control of multiple thermostats with a single action.
Figure 22:
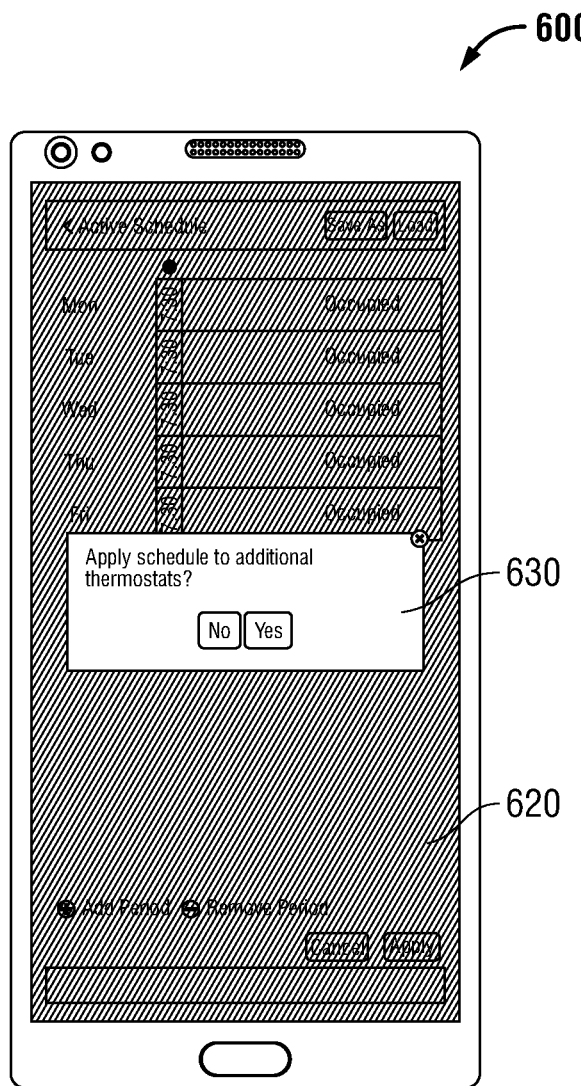
Figure 23:
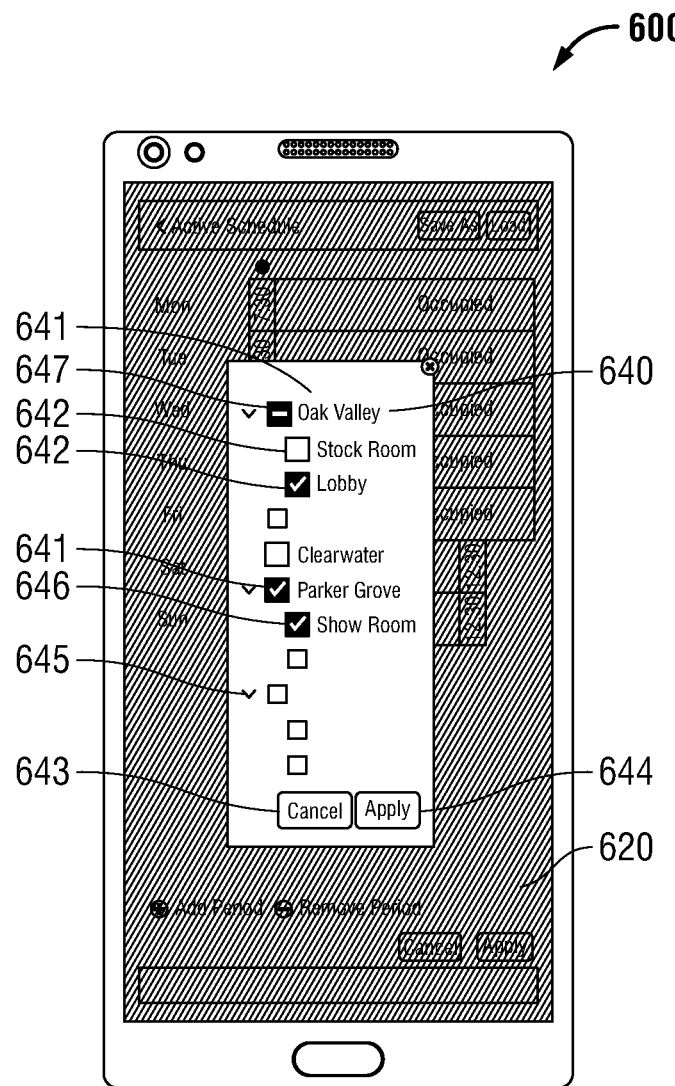

With attention now to FIGS. 21-23, flexible scheduling user interface 600 that can send event settings to one or more HVAC thermostats 10 in a single action is shown. User interface 600 includes a scheduling grid 614 consisting of one row 609 for each day of the week, each row representing a 24 hour timeline of that day. A column of day buttons 601 is arranged vertically down the left side of user interface 600 that are each associated with a corresponding row 609. Each of the rows 609 may include event (occupied) regions 610 and non-event (unoccupied) regions 612 scheduled for each day. A start time indicator 604*a* is presented proximate to the left (start) edge of an occupancy period, and an end time indicator 604*b* is presented proximate to the right (end) edge of an occupancy period. User interface 600 includes add period button 606, remove (e.g., delete) period button 607, cancel button 623, and apply (e.g., save) button 624. Preferably, user interface 600 and user interface 650 (discussed below) are adapted for use with a touchscreen device such as a smart phone or tablet computer, however, user interface 600 and user interface 650 may be advantageously utilized with thermostat 10, a desktop computer, a notebook computer, and so forth. In use, a user may add an occupied period by touching the add period button 606 and touching the region in which the new occupied period is to be created. To delete an occupied period, the user may touch the occupied period to be deleted and touch the remove button 607.

To modify the start or end time of an occupied period, the user may touch the desired occupied period 610 and touch/drag the left edge leftward to decrease the start time (e.g., the event will start earlier) or touch/drag the left edge rightward to increase the start time (e.g., the event will end later). In some embodiments, the start time indicator 604*a* and/or the end time indicator 604*b* is updated as the user drags the start or end time of the period, respectively, to provide the user with immediate visual confirmation of the adjustment.

Figure 27:
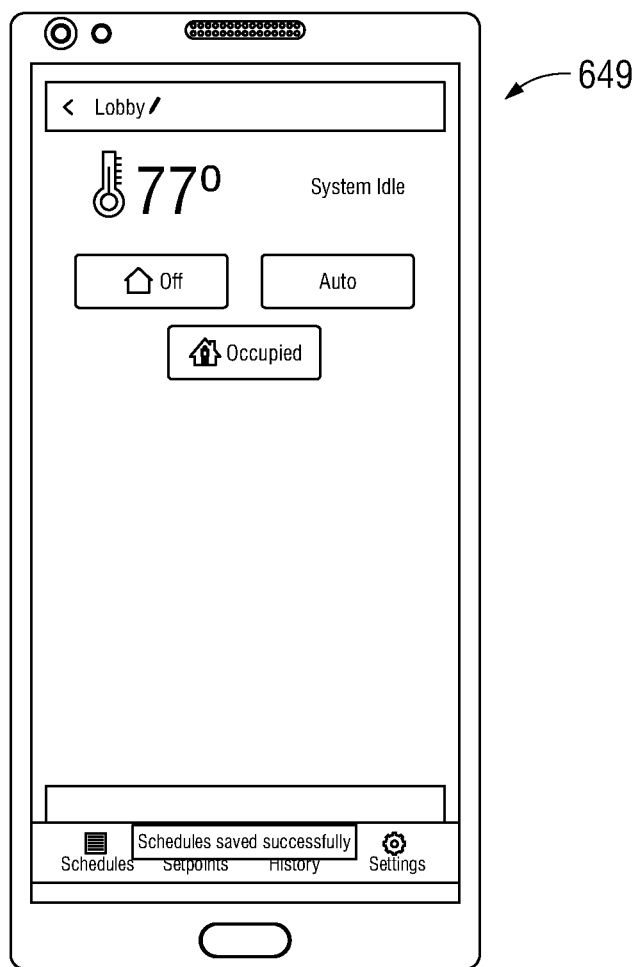

The user may continue to add, remove, or modify events by repeating the above-described steps. Once the user has completed the desired inputs, the user may touch apply button 624 to save the changes; or the user may touch cancel button 623 to discard any changes and return the schedule to its prior state. If the save button 624 is used, user interface 600 presents a pop-up dialog box 630 that ask the user whether the changes should be applied to additional thermostats. Additionally, the underlying non-dialog box portion 620 of user interface 600 is temporarily shaded to draw the user's attention to pop-up dialog box 630. If the user chooses "no" the changes are saved to a the original targeted thermostat and user interface 600 returns to a home screen 649 (FIG. 27). If the user chooses "yes" to save to additional thermostats, a pop-up thermostat selection box 640 is presented. Thermostat selection box 640 includes a list of thermostat identifiers 642 that represent one or more additional thermostats. A check box 646 is positioned proximate to each thermostat identifier 642 to enable the user to select, or deselect, additional thermostats to which the changed schedule is to be saved. The list of thermostat identifiers may be arranged in one or more groups 641. Member thermostats of each group may be hidden or revealed by touching an expansion button 645 associated with each group. A group check box 647 is positioned proximate to each group name, which enables a user to select, or deselect, all member of the group in a single step, while still enabling a user to select or deselect individual thermostat members of the group, as desired. In the list of thermostats, specific thermostats may be unselectable (grayed out). For example, any non-communicating thermostats will not be selectable, and/or any thermostats on which the scheduling feature is disabled will not be selectable.

After the user has completed selecting the destination thermostats, the user may choose to apply or cancel the changes. If the apply button 624 is touched, the schedule changes are communicated to the selected thermostats (including the original thermostat which was edited, above). In embodiments, the changes are communicated to cloud services 26, which, in turn pushes the changes to the selected thermostats. Advantageously, cloud services 26 may optionally queue and store changes destined for thermostats which may be offline or unreachable until such time such thermostats are again online or reachable. In embodiments, an acknowledgement is sent from cloud service 26 to user interface 600 to confirm the changes were successfully transmitted to the selected thermostats.

Figure 24:
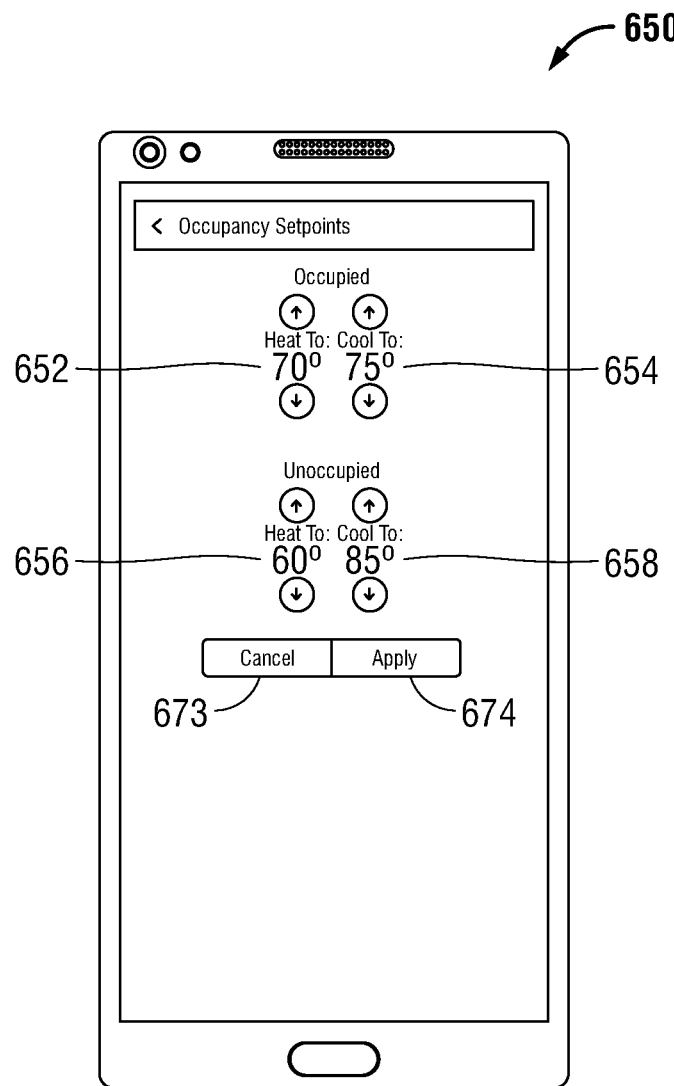
Figure 25:
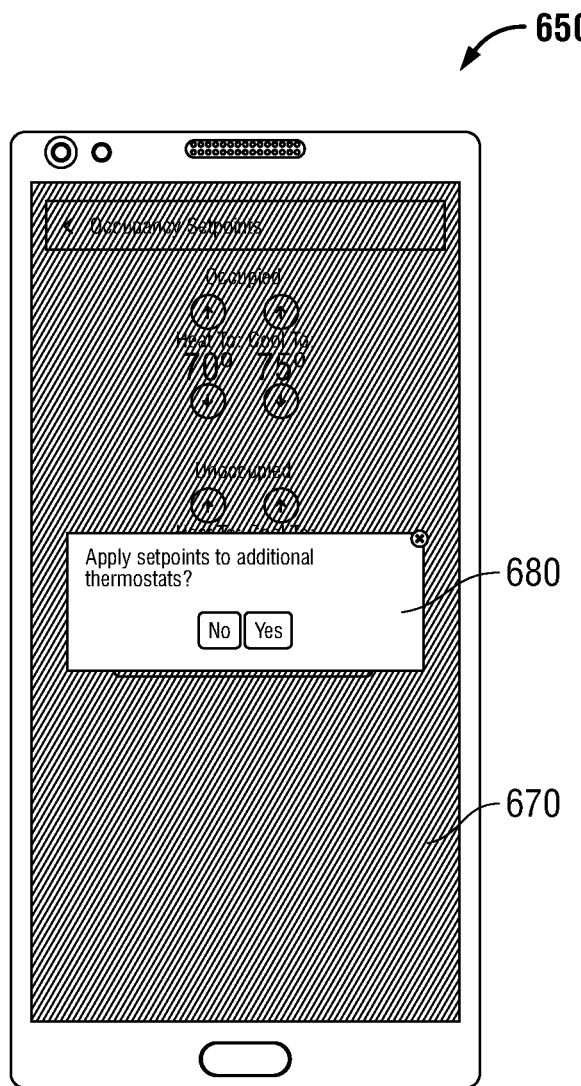
Figure 26:
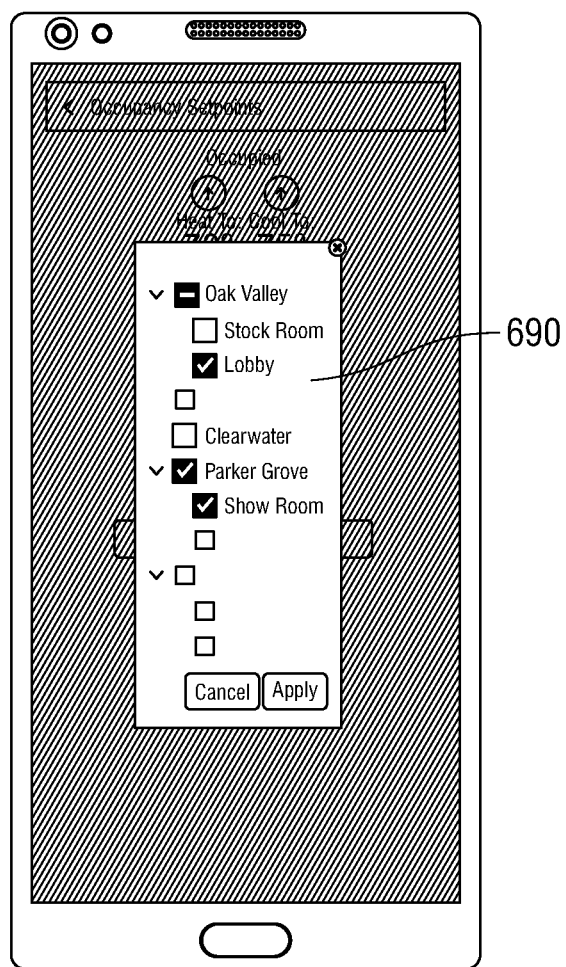

FIGS. 24-26 show a flexible scheduling user interface 650 that enables a user to specify heating and cooling setpoints for both occupied and unoccupied modes, to one or more HVAC thermostats 10, in a single action. User interface 650 includes occupied heating control 652, occupied cooling control 654, unoccupied heating control 656, and unoccupied cooling control 658. User interface 650 further includes cancel button 673, and apply (e.g., save) button 674. In use, the user may adjust the desired setpoint by touching the up or down arrow of the appropriate control. Once the user has completed the desired inputs, the user may touch apply button 674 to save the changes; or the user may touch cancel button 673 to discard any changes and return the schedule to its prior state. If the apply button 674 is touched, user interface 650 presents a pop-up dialog box 680 that asks the user whether the changes should be applied to additional thermostats. Additionally, the underlying non-dialog box portion 670 of user interface 650 is temporarily shaded to draw the user's attention to pop-up dialog box 680. If the user chooses "no" the changes are saved to the originally targeted thermostat and user interface 650 returns to a home screen 649 (FIG. 27). If the user chooses "yes" to save to additional thermostats, a pop-up thermostat selection box 690 is presented as shown in FIG. 26. The user may then proceed to select additional thermostats in the manner described above.

Figure 28:
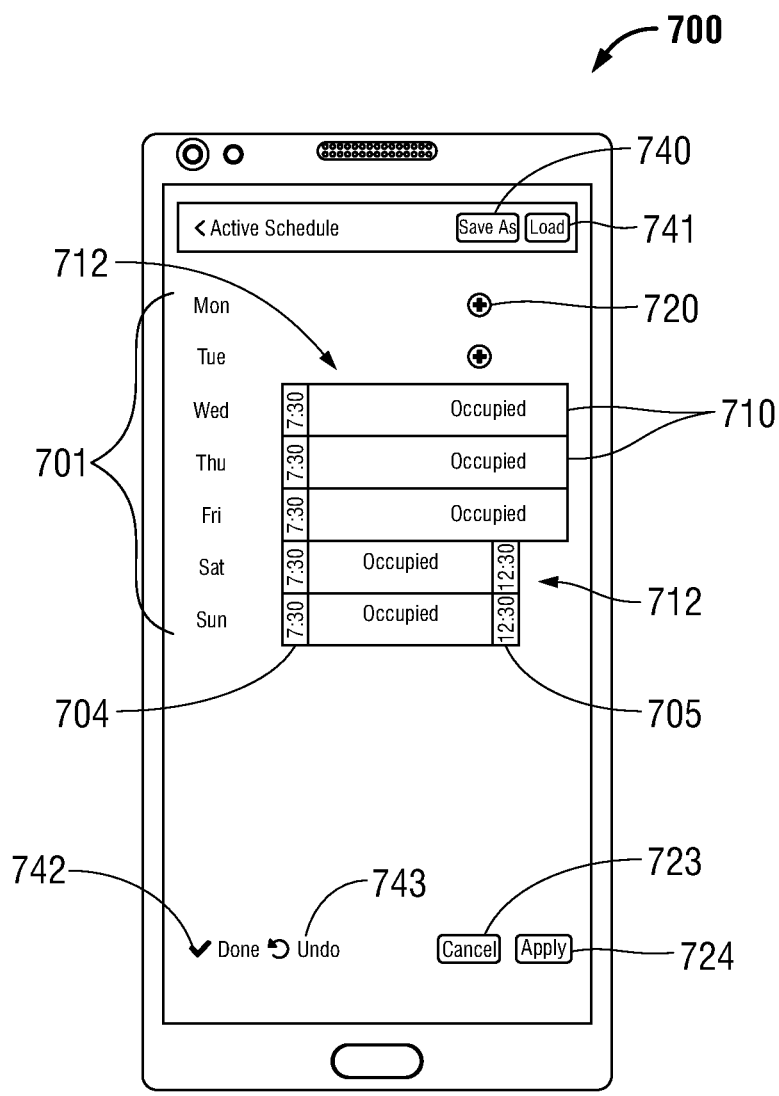
FIGS. 28-29 illustrate another exemplary embodiment of a flexible scheduling user interface for adding and deleting events to an HVAC thermostat in accordance with the present disclosure.
Figure 29:
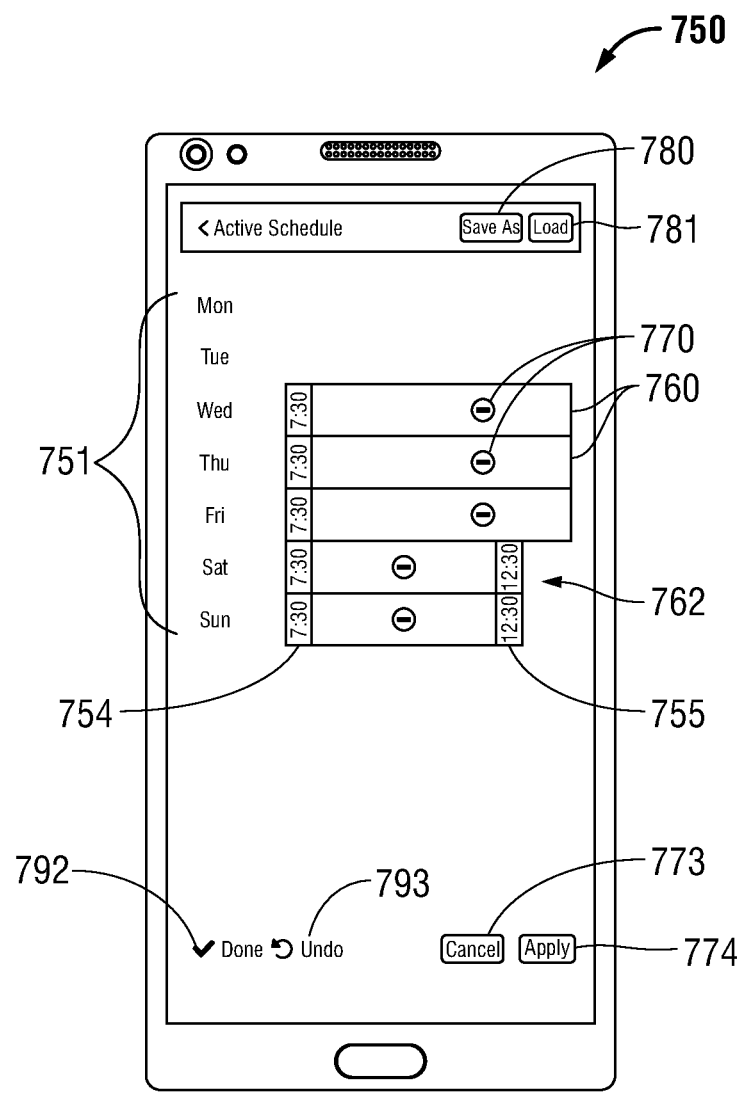

FIGS. 28-29 illustrate another exemplary embodiment of a flexible scheduling user interface for adding and deleting events to HVAC thermostat 10. In FIG. 28, user interface 700 is in add mode in which it is possible to add periods as indicated by the presentation of one or more addition buttons 720, which, as seen in the present example embodiment, are represented by a white plus sign within a blue circle. One or more occupied periods 710 may be displayed as rectangular horizontal regions arranged in rows, each row corresponding to a day-of-week (701). Each occupied period 710 may optionally include a start time indicator 704 and an end time indicator 705. Additionally, a cancel button 723 and a save button 724 are presented, and done button 742 and undo button 743 may be presented. Upon entry into add mode user interface 700, an addition button 720 is placed in each unoccupied period 712 as described above. The active area of addition button(s) 720 may include the area within the button itself, and/or may extend to include the region defined by the unoccupied period 712 in which addition button 720 is placed.

To add an occupancy period, event, the user touches the active area of the addition button 720 in the unoccupied period 712 in which the new event is to be created. Once the new occupancy period 710 is created, a user may adjust the start and/or end time by a click-drag gesture (using a pointing device such as a mouse) or touch-drag gesture (using a finger and a touch-responsive display panel) to move the start or end time to the desired position. Optionally, the corresponding start time indicator 704 or end time indicator 705 is updated concurrently with the user's adjustment gesture to provide visual feedback and confirmation that the desired time is correctly set. The user may then confirm the last change by touching done button 742, or revert the change by touching undo button 743. If the user is satisfied with all changes, apply button 724 is used to apply all changes made during the present add mode to the thermostat 10 schedule. Otherwise, the user may choose cancel button 723 to discard all changes made during the present add mode, with no changes made to the thermostat 10 schedule.

User interface 700 includes "save as" button 740 which enables the user to store the current schedule in a collection of schedule presets. The enables a user to quickly and easily recall a saved schedule using load button 741 and apply it to a first thermostat 10 at a later time, or to another thermostat 10, without the need to re-enter the entire schedule. In embodiment, saved schedules may be shared among users using any suitable communications protocol, such as email, SMS or MMS messaging, a social media post and the like, using any suitable encoding such as, for example, HTML, XML, JSON, and so forth.

FIG. 29 shows a user interface 750 in delete mode in which it is possible to delete periods as indicated by the presentation of one or more deletion buttons 770, which, as seen in the present example embodiment, are represented by a white minus sign within a solid red circle. One or more occupied periods 760 are displayed as rectangular horizontal regions arranged in rows as described above with respect to user interface 700. Upon entry into delete mode user interface 750, a deletion button 770 is placed in each occupied period 760 as described above. The active area of deletion button(s) 770 may include the area within deletion button 770 itself, and/or may extend to include the region defined by the occupied period 760 in which deletion button 770 is placed.

To delete an occupancy period, event, the user touches the active area of the deletion button 720 in the occupied period 710 to be deleted. The user may then confirm the last deletion by touching done button 792, or revert the deletion by touching undo button 793. If the user is satisfied with all deletions, apply button 744 is used to apply all deletions made during the present delete mode to the thermostat 10 schedule. Otherwise, the user may choose cancel button 773 to discard all deletion made during the present delete mode, with no changes made to the thermostat 10 schedule.

Particular embodiments of the present disclosure have been described herein, however, it is to be understood that the disclosed embodiments are merely examples of the disclosure, which may be embodied in various forms. Well-known functions or constructions are not described in detail to avoid obscuring the present disclosure in unnecessary detail. Therefore, specific structural and functional details disclosed herein are not to be interpreted as limiting, but merely as a basis for the claims and as a representative basis for teaching one skilled in the art to variously employ the present disclosure in any appropriately detailed structure.

What is claimed is:

1. A method of facilitating user interaction with an HVAC control device having a touch-responsive display and operable in an occupied mode and an unoccupied mode, comprising:
    displaying an informational region comprising non-interactive user interface elements;
    displaying a control region comprising interactive user-interface elements, wherein at least one of the interactive user-interface elements of the control region includes a temperature setpoint increase control and a temperature setpoint decrease control;
    displaying an override region comprising an occupied status display and an occupancy override control having an override state and a non-override state;
    displaying a variable opacity region comprising the informational region and the control region;
    in response to a determination that a restriction is imposed with respect to changing a setting of at least one of the interactive user-interface elements, increasing an opacity of the variable opacity region in a manner indicating that user input to the control region is blocked;
    receiving, at the occupancy override control, a user input switching the occupancy override control from the non-override state to the override state;
    displaying the variable opacity region with a first predefined opacity, having a decreased opacity, indicating the restriction is no longer imposed; and
    activating the control region.

2. The method in accordance with claim 1, wherein when the HVAC control device is operating in the occupied mode the variable opacity region is displayed with the first predefined opacity and when the HVAC control device is operating in the unoccupied mode the variable opacity region is displayed with a second predefined opacity.

3. The method in accordance with claim 1, wherein the control region is inactive when the HVAC control device is operating in the unoccupied mode.

4. The method in accordance with claim 1, further comprising:
    receiving, at the occupancy override control, a user input switching the occupancy override control from the override state to the non-override state;
    displaying the variable opacity region with a second predefined opacity; and
    deactivating the control region.

5. The method in accordance with claim 1, further comprising visually highlighting the override region when the variable opacity region is displayed with a first predefined opacity.

6. A method of operating an HVAC control device having a touch-responsive display screen and scheduled occupancy states and non-occupancy states, comprising:
    defining a first portion of the display screen having a setpoint change control panel, wherein the change control panel comprises a temperature setpoint increase control and a temperature setpoint decrease control;
    defining a second portion of the display screen having an occupancy control panel;
    detecting a transition of scheduled occupancy state;
    in response to the transition being to a non-occupied state, applying, to the setpoint change control panel, a visual opacity effect indicating user input to the setpoint change control panel is blocked;
    in response to the transition being to an occupied state, removing the visual opacity effect from the setpoint change control panel, indicating user input to the setpoint change control panel is no longer blocked;
    receiving a user input selecting the state of an occupancy override mode;
    in response to the user input selecting an enabled state of the occupancy override mode, removing the visual opacity effect from the setpoint change control panel; and
    in response to the user input selecting a disabled state of the occupancy override mode, applying the visual opacity effect to the setpoint change control panel.

7. The method in accordance with claim 6, further comprising disabling the setpoint change control panel in response to the transition being to the non-occupied state.

8. The method in accordance with claim 6, further comprising enabling the setpoint change control panel in response to the transition being to the occupied state.

9. An HVAC control device operable in an occupied mode and an unoccupied mode, comprising:
    a processor;
    a touch-responsive display operatively coupled to the processor; and
    a memory operatively coupled to the processor including a set of executable instructions which, when executed by the processor, cause the HVAC control device to:
        display an informational region comprising non-interactive user interface elements;
        display a control region comprising interactive user-interface elements comprising a temperature setpoint increase control and a temperature setpoint decrease control;
        display an override region comprising an occupied status display and an occupancy override control having an override state and a non-override state;
        display a variable opacity region comprising the informational region and the control region;
        in response to a determination that a restriction is imposed with respect to changing a setting of at least one of the interactive user-interface elements, increasing an opacity of the variable opacity region in a manner indicating that user input to the control region is blocked;
        receive, at the occupancy override control, a user input switching the occupancy override control from the non-override state to the override state;
        display the variable opacity region with a first predefined opacity, having a decreased opacity, that is determined to indicate the restriction is no longer imposed; and
        activate the control region.

10. The HVAC control device in accordance with claim 9, wherein when the HVAC control device is operating in the occupied mode the variable opacity region is displayed with the first predefined opacity and when the HVAC control device is operating in the unoccupied mode the variable opacity region is displayed with a second predefined opacity.

11. The HVAC control device in accordance with claim 9, wherein the control region is inactive when the HVAC control device is operating in the unoccupied mode.

12. The HVAC control device in accordance with claim 9, wherein the memory further comprises instructions which, when executed by the processor, cause the processor to:
receive, at the occupancy override control, a user input switching the occupancy override control from the override state to the non-override state; and
display the variable opacity region with a second predefined opacity.

13. The HVAC control device in accordance with claim 9, wherein the override region includes visual highlighting when the variable opacity region is displayed with the first predefined opacity.

14. An HVAC control device operable in an occupied mode and an unoccupied mode, comprising:
a processor;
a touch-responsive display operatively coupled to the processor; and
a memory operatively coupled to the processor including a set of executable instructions which, when executed by the processor, cause the HVAC control device to:
define a portion of the display screen having a setpoint change control panel comprising a temperature setpoint increase control and a temperature setpoint decrease control;
define a portion of the display screen having an occupancy control panel;
detect a transition of scheduled occupancy state;
in response to the occupancy state transitioning to a non-occupied state, apply a visual opacity effect to the setpoint change control panel, the visual opacity effect indicting user input to the setpoint change control panel is disabled;
in response to the occupancy state transitioning to an occupied state, remove the visual opacity effect from the setpoint change control panel, indicating user input to the setpoint change control panel is enabled;
receive a user input selecting an occupancy override mode;
in response to the user input enabling the occupancy override mode, removing the visual opacity effect from the setpoint change control panel; and
in response to the user input disabling the occupancy override mode, applying the visual opacity effect to the setpoint change control panel.

15. The HVAC control device in accordance with claim 14, wherein the setpoint change control panel is disabled when the occupancy state has transitioned to a non-occupied state.

16. The HVAC control device in accordance with claim 14, wherein the setpoint change control panel is enabled when the occupancy state has transitioned to an occupied state.

* * * * *